US012154503B2

(12) United States Patent
Shang et al.

(10) Patent No.: US 12,154,503 B2
(45) Date of Patent: Nov. 26, 2024

(54) PARAMETER ADJUSTMENT METHOD OF DISPLAY MODULE AND SYSTEM, DISPLAY MODULE, AND DISPLAY DEVICE

(71) Applicant: BOE TECHNOLOGY GROUP CO., LTD., Beijing (CN)

(72) Inventors: Guangliang Shang, Beijing (CN); Li Wang, Beijing (CN); Baoyun Wu, Beijing (CN); Xiyu Zhao, Beijing (CN); Yu Feng, Beijing (CN); Libin Liu, Beijing (CN); Shiming Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/043,467

(22) PCT Filed: Feb. 24, 2022

(86) PCT No.: PCT/CN2022/077770
§ 371 (c)(1),
(2) Date: Feb. 28, 2023

(87) PCT Pub. No.: WO2023/159447
PCT Pub. Date: Aug. 31, 2023

(65) Prior Publication Data

US 2024/0290260 A1 Aug. 29, 2024

(51) Int. Cl.
*G09G 3/3233* (2016.01)

(52) U.S. Cl.
CPC ....... *G09G 3/3233* (2013.01); *G09G 2310/08* (2013.01); *G09G 2320/0247* (2013.01); *G09G 2320/0271* (2013.01); *G09G 2330/021* (2013.01)

(58) Field of Classification Search
CPC ............ G09G 3/3233; G09G 2310/08; G09G 2320/0247; G09G 2320/0271; G09G 2330/021
See application file for complete search history.

(56) References Cited

U.S. PATENT DOCUMENTS

| | | | | |
|---|---|---|---|---|
| 2019/0051250 | A1* | 2/2019 | Lee | G09G 3/3233 |
| 2020/0082768 | A1* | 3/2020 | Oh | G09G 3/3291 |
| 2022/0028314 | A1* | 1/2022 | Kwon | G09G 3/3258 |

* cited by examiner

*Primary Examiner* — Brent D Castiaux
(74) *Attorney, Agent, or Firm* — Dority & Manning, P.A.

(57) ABSTRACT

A parameter adjustment method of a display module includes: setting an initial value of a light-emitting delay time and specified gray levels; based on the initial value of the light-emitting delay time, adjusting the light-emitting delay time stepwise until a value of an adjusted light-emitting delay time exceeds a preset range of the light-emitting delay time, so that values of the light-emitting delay time within the preset range of the light-emitting delay time are obtained; obtaining flicker values of the display module at the specified gray levels for each value of the light-emitting delay time; and determining a preferred value of the light-emitting delay time from the values of the light-emitting delay time according to flicker values corresponding to the values of the light-emitting delay time.

20 Claims, 17 Drawing Sheets

PARAMETER ADJUSTMENT METHOD OF DISPLAY MODULE AND SYSTEM, DISPLAY MODULE, AND DISPLAY DEVICE

CROSS-REFERENCE TO RELATED APPLICATION

This application is a national phase entry under 35 USC 371 of International Patent Application No. PCT/CN2022/077770, filed on Feb. 24, 2022, which is incorporated herein by reference in its entirety.

TECHNICAL FIELD

The present disclosure relates to the field of display technologies, and in particular, to a parameter adjustment method of a display module, an electronic device, a parameter adjustment system of a display module, a display module, a display device, a computer-readable storage medium, and a computer program product.

BACKGROUND

Active-matrix organic light-emitting diode (AMOLED) display modules have advantages of self-luminous, low-power consumption, wide viewing angle, fast response speed and high contrast ratio and thus are widely used in smart products such as cell phones, televisions, and notebook computers. In addition, the AMOLED display modules have become a research focus for many scholars at home and aboard due to their characteristics of light weight, small thickness, and bending resistance.

SUMMARY

In an aspect, a parameter adjustment method of a display module is provided. The display module is capable of operating in a low frequency driving mode, the low frequency driving mode includes a plurality of low frequency cycles, and a low frequency cycle includes a refresh frame and at least one keep frame.

The parameter adjustment method includes: setting an initial value of a light-emitting delay time and a plurality of specified gray levels, the light-emitting delay time being a time interval between a start of a charging period of a frame of the refresh frame and the at least one keep frame and a start of a light-emitting period of the frame; based on the initial value of the light-emitting delay time, adjusting the light-emitting delay time stepwise until a value of an adjusted light-emitting delay time exceeds a preset range of the light-emitting delay time, so that a plurality of values of the light-emitting delay time within the preset range of the light-emitting delay time are obtained; obtaining a plurality of flicker values of the display module at the plurality of specified gray levels for each value of the light-emitting delay time; and determining a preferred value of the light-emitting delay time from the plurality of values of the light-emitting delay time according to a plurality of flicker values corresponding to the plurality of values of the light-emitting delay time.

In some embodiments, obtaining the flicker values of the display module at the plurality of specified gray levels for each value of the light-emitting delay time, includes: setting an initial value of a first initialization sub-signal, the first initialization sub-signal being an initialization signal received by a light-emitting device included in the display module during the refresh frame; based on the initial value of the first initialization sub-signal, adjusting the first initialization sub-signal stepwise until a value of an adjusted first initialization sub-signal exceeds a preset range of the first initialization sub-signal, so that a plurality of values of the first initialization sub-signal within the preset range of the first initialization sub-signal are obtained, a number of the plurality of values of the light-emitting delay time being M, a number of the plurality of values of the first initialization sub-signal being N, the M values of the light-emitting delay time and the N values of the first initialization sub-signal being divided into M×N first parameter groups, a first parameter group including a single value of the light-emitting delay time and a single value of the first initialization sub-signal; and obtaining the plurality of flicker values of the display module at the plurality of specified gray levels for each first parameter group of the M×N first parameter groups.

In some embodiments, flicker values corresponding to a single first parameter group constitute a single set of flicker values. Determining the preferred value of the light-emitting delay time from the plurality of values of the light-emitting delay time according to the plurality of flicker values corresponding to the plurality of values of the light-emitting delay time, includes: determining a target value of the light-emitting delay time corresponding to each value of the first initialization sub-signal from the M values of the light-emitting delay time, so as to obtain a plurality of target values of the light-emitting delay time, the target value of the light-emitting delay time being a value of the light-emitting delay time corresponding to a set of flicker values with a highest convergence in M sets of flicker values, the M sets of flicker values corresponding to the M values of the light-emitting delay time and each including the value of the first initialization sub-signal; determining a preferred value of the first initialization sub-signal, wherein the preferred value of the first initialization sub-signal is one of the N values of the first initialization sub-signal; and determining a target value of the light-emitting delay time corresponding to the preferred value of the first initialization sub-signal as a preferred value of the light-emitting delay time.

In some embodiments, determining the preferred value of the first initialization sub-signal from the N values of the first initialization sub-signal, includes: obtaining a plurality of values of a second initialization sub-signal; determining one value of the plurality of values of the second initialization sub-signal as a preferred value of the second initialization sub-signal, the second initialization sub-signal being an initialization signal received by the light-emitting device during a keep frame; for the preferred value of the second initialization sub-signal, obtaining N flicker values at a target gray level corresponding to the N values of the first initialization sub-signal, the target gray level being one of the plurality of specified gray levels; and determining a value of the first initialization sub-signal corresponding to a minimum flicker value of the N flicker values as the preferred value of the first initialization sub-signal.

In some embodiments, obtaining the plurality of values of the second initialization sub-signal, includes: setting an initial value of the second initialization sub-signal; and based on the initial value of the second initialization sub-signal, adjusting the second initialization sub-signal stepwise until a value of an adjusted second initialization sub-signal exceeds a preset range of the second initialization sub-signal, so that the plurality of values of the second initialization sub-signal within the preset range of the second initialization sub-signal are obtained, the number of the plurality of values of the first initialization sub-signal being N, a number of the plurality of values of the second initialization sub-signal being K, the N values of the first initialization sub-signal and the K values of the second initialization sub-signal being divided into N×K second parameter groups, a second parameter group including one value of the first initialization sub-signal and one value of the second initialization sub-signal; determining the one value of the plurality of values of the second initialization sub-signal as the preferred value of the second initialization sub-signal, includes: obtaining a plurality of flicker values of the display module at the plurality of specified gray levels for a target value of the plurality of target values of the light-emitting delay time and each second parameter group of the N×K second parameter groups; selecting a specified gray level from the plurality of specified gray levels as the target gray level, a difference between a maximum flicker value and a minimum flicker value in flicker values at the target gray level for the N values of the first initialization sub-signal and each value of the second initialization sub-signal being within a first preset threshold range, and/or a flicker value at the target gray level for each of the second parameter groups being within a second preset threshold range; and determining a value of the second initialization sub-signal from the plurality of values of the second initialization sub-signal as the preferred value of the second initialization sub-signal, a range of flicker values of the display module at the target gray level for the value of the second initialization sub-signal being maximum.

In some embodiments, obtaining the plurality values of the second initialization sub-signal, includes: setting an initial value of the second initialization sub-signal; selecting a specified gray level from the plurality of specified gray levels as the target gray level; and based on the initial value of the second initialization sub-signal, adjusting the second initialization sub-signal stepwise until a value of an adjusted second initialization sub-signal exceeds a preset range of the second initialization sub-signal, so that a plurality of values of the second initialization sub-signal within the preset range of the second initialization sub-signal are obtained, the number of the plurality of values of the first initialization sub-signal being N, a number of the plurality of values of the second initialization sub-signal being K, the N values of the first initialization sub-signal and the K values of the second initialization sub-signal being divided into N×K second parameter groups, a second parameter group including one value of the first initialization sub-signal and one value of the second initialization sub-signal; determining the one value of the plurality of values of the second initialization sub-signal as the preferred value of the second initialization sub-signal, includes: obtaining a flicker value of the display module at the target gray level for a target value of the plurality of target values light-emitting delay time and each second parameter group of the N×K second parameter groups; and determining a value of the second initialization sub-signal, corresponding to a minimum flicker value of the display module at the target gray level, from the plurality of values of the second initialization sub-signal as the preferred value of the second initialization sub-signal.

In some embodiments, determining the preferred value of the light-emitting delay time from the plurality of values of the light-emitting delay time according to the plurality of flicker values corresponding to the plurality of values of the light-emitting delay time, includes: determining a value of the light-emitting delay time corresponding to a minimum flicker value of the display module at each specified gray level for the plurality of values of the light-emitting delay time as a target value of the light-emitting delay time; in a case where the plurality of specified gray levels correspond to one target value of the light-emitting delay time, determining the one target value of the light-emitting delay time as the preferred value of the light-emitting delay time; in a case where the plurality of specified gray levels correspond to a plurality of target values of the light-emitting delay time, determining one of the plurality of target values of the light-emitting delay time as the preferred value of the light-emitting delay time, wherein a number of minimum flicker values corresponding to the preferred light-emitting delay time is greater than or equal to a number of minimum flicker values corresponding to each of remaining target values of the light-emitting delay time.

In some embodiments, the parameter adjustment method further includes: setting an initial value of a first initialization sub-signal, the first initialization sub-signal being an initialization signal received by a light-emitting device during the refresh frame; based on the initial value of the first initialization sub-signal, adjusting the first initialization sub-signal stepwise until a value of an adjusted first initialization sub-signal exceeds a preset range of the first initialization sub-signal, so that a plurality of values of the first initialization sub-signal within the preset range of the first initialization sub-signal are obtained, a number of the plurality of values of the first initialization sub-signal being N;

setting an initial value of a second initialization sub-signal, the second initialization sub-signal being an initialization signal received by the light-emitting device during a keep frame; based on the initial value of the second initialization sub-signal, adjusting the second initialization sub-signal stepwise until a value of an adjusted second initialization sub-signal exceeds a preset range of the second initialization sub-signal, so that a plurality of values of the second initialization sub-signal within the preset range of the second initialization sub-signal are obtained, a number of the plurality of values of the second initialization sub-signal being K, the N values of the first initialization sub-signal and the K values of the second initialization sub-signal being divided into N×K second parameter groups, a second parameter group including a single value of the first initialization sub-signal and a single value of the second initialization sub-signal;

obtaining a plurality of flicker values of the display module at the plurality of specified gray levels for the preferred value of the light-emitting delay time and each second parameter group of the N×K second parameter groups; selecting a specified gray level from the plurality of specified gray levels as a target gray level, a difference between a maximum flicker value and a minimum flicker value in flicker values at the target gray level for the N values of the first initialization sub-signal and each value of second initialization sub-signal being within a first preset threshold range, and/or a flicker value at the target gray level for each of the second parameter groups being within a second preset threshold range; and determining a value of the second initialization sub-signal from the plurality of values of the second initialization sub-signal as a preferred value of the second initialization sub-signal, a range of flicker values of the display module at the target gray level for the value of the second initialization sub-signal being maximum.

In some embodiments, the first preset threshold range is from 10 dB to 15 dB; and/or, the second preset threshold range is from −40 dB to −70 dB.

In some embodiments, the parameter adjustment method further includes: setting an initial value of a first initialization sub-signal, the first initialization sub-signal being an initialization signal received by a light-emitting device during the refresh frame; based on the initial value of the first initialization sub-signal, adjusting the first initialization sub-signal stepwise until a value of an adjusted first initialization sub-signal exceeds a preset range of the first initialization sub-signal, so that a plurality of values of the first initialization sub-signal within the preset range of the first initialization sub-signal are obtained, a number of the plurality of values of the first initialization sub-signal being N; setting an initial value of a second initialization sub-signal and selecting a specified gray level from the plurality of specified gray levels as a target gray level, the second initialization sub-signal being an initialization signal received by the light-emitting device during a keep frame;

based on the initial value of the second initialization sub-signal, adjusting the second initialization sub-signal stepwise until a value of an adjusted second initialization sub-signal exceeds a preset range of the second initialization sub-signal, so that a plurality of values of the second initialization sub-signal within the preset range of the second initialization sub-signal are obtained, a number of the plurality of values of the second initialization sub-signal being K, the N values of the first initialization sub-signal and the K values of the second initialization sub-signal being divided into N×K second parameter groups, a second parameter group including a single value of the first initialization sub-signal and a single value of the second initialization sub-signal; obtaining a plurality of flicker values of the display module at the target gray level for the preferred value of the light-emitting delay time and each second parameter group of the N×K second parameter groups; and determining a value of the second initialization sub-signal, corresponding to a minimum flicker value of the display module at the target gray level, from the plurality of values of the second initialization sub-signal as a preferred value of the second initialization sub-signal.

In some embodiments, the parameter adjustment method further includes: determining a value of the first initialization sub-signal, corresponding to a minimum flicker value of flicker values of the display module at the target gray level for the plurality of values of the first initialization sub-signal and the preferred value of the second initialization sub-signal, as a preferred value of the first initialization sub-signal.

In some embodiments, the parameter adjustment method further includes: setting an initial value of a data keep signal, the data keep signal being a data signal received by a data signal terminal of a pixel driving circuit included in the display module during a keep frame; based on the initial value of the data keep signal, adjusting the data keep signal stepwise until a value of an adjusted data keep signal exceeds a preset range of the data keep signal, so that a plurality of values of the data keep signal within the preset range of the data keep signal are obtained; obtaining a flicker value of the display module at the target gray level for the preferred value of the light-emitting delay time, the preferred value of the first initialization sub-signal, the preferred value of the second initialization sub-signal, and each value of the data keep signal; and determining a value of the data keep signal corresponding to a minimum flicker value at the target gray level for the plurality of values of the data keep signal as a preferred value of the data keep signal.

In some embodiments, the preset range of the first initialization sub-signal is from −1 V to −6 V.

In some embodiments, the preset range of the second initialization sub-signal is from −1 V to −6 V.

In some embodiments, the preset range of the data keep signal is from 1 V to 8 V.

In some embodiments, the preset range of the light-emitting delay time is from 0 to 30 times a row scan period.

In another aspect, an electronic device is provided. The electronic device includes a processor and a memory storing computer program instructions. When executed on the processor, the computer program instructions cause the processor to perform one or more steps of the parameter adjustment method as described above.

In yet another aspect, a parameter adjustment system of a display module is provided. The parameter adjustment system of the display module includes a processor, a testing device, and a detection device. The processor is configured to perform one or more steps of the parameter adjustment method as described above. The testing device is coupled to the processor. The testing device is configured to output a control instruction for controlling display of the display module according to the light-emitting delay time, a first initialization sub-signal, a second initialization sub-signal and a data keep signal that are from the processor. The detection device is coupled to the processor. The detection device is configured to detect a flicker value when the display module displays an image, and send the flicker value to the processor.

In yet another aspect, a display module is provided. The display module includes a display panel and a driver chip; the driver chip stores the preferred value of the light-emitting delay time, the preferred value of the light-emitting delay time is obtained through the parameter adjustment method as described in any one of the above embodiments; and the driver chip is configured to generate light-emitting signals according to the preferred value of the light-emitting delay time and transmit the light-emitting signals to the display panel.

In some embodiments, the driver chip further stores at least one of a preferred value of a first initialization sub-signal, a preferred value of a second initialization sub-signal, and a preferred value of a data keep signal; the preferred value of the first initialization sub-signal is obtained through the parameter adjustment method as described in the above embodiments, the preferred value of the second initialization sub-signal is obtained through the parameter adjustment method as described in the above embodiments, and the preferred value of the data keep signal is obtained through the parameter adjustment method as described in the above embodiments.

In yet another aspect, a display device is provided. The display device includes the display module as described in any one of the above embodiments.

In yet another aspect, a non-transitory computer-readable storage medium is provided. The computer-readable storage medium stores computer program instructions that, when executed on the processor, cause the processor to perform one or more steps of the parameter adjustment method as described in any one of the above embodiments.

In yet another aspect, a computer program product is provided. The computer program product is stored on a non-transitory computer-readable storage medium. The computer program product includes computer program instructions that, when executed on a computer, cause the computer to perform the parameter adjustment method as described in any one of the above embodiments.

In yet another aspect, a computer program is provided. When executed on a computer, the computer program causes the computer to perform the parameter adjustment method of the display module as described in any one of the above embodiments.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
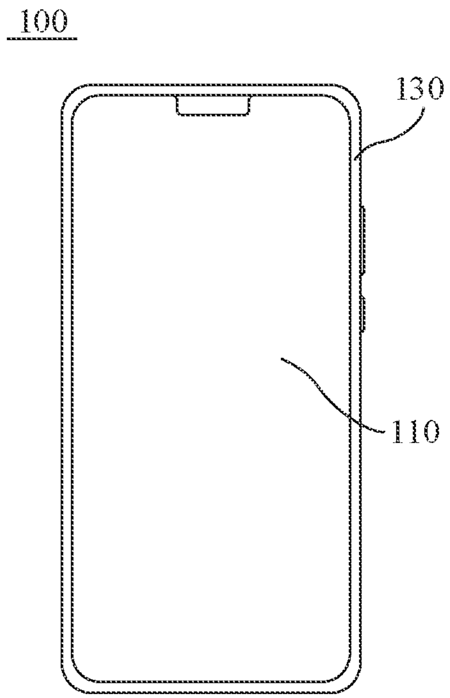
FIG. 1 is a structural diagram of a display device, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the quantity of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms "coupled", "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact with each other. The term "coupled" or "communicatively coupled", however, may also mean that two or more components are not in direct contact with each other, but yet still co-operate or interact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" as used herein indicates an open and inclusive expression, which does not exclude devices that are applicable to or configured to perform additional tasks or steps.

Additionally, the phrase "based on" as used herein is meant to be open and inclusive, since a process, step, calculation or other action that is "based on" one or more of the stated conditions or values may, in practice, be based on additional conditions or values beyond those stated.

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed as being limited to the shapes of the regions shown herein, but including deviations in shape due to, for example, manufacturing. For example, an etched region shown in a rectangular shape generally has a feature of being curved. Therefore, the regions shown in the accompanying drawings are schematic in nature, and their shapes are not intended to show actual shapes of regions in a device, and are not intended to limit the scope of the exemplary embodiments.

Some embodiments of the present disclosure provide a parameter adjustment method of a display module, an electronic device, a parameter adjustment system of a display module, a display module, a display device, a computer-readable storage medium, and a computer program product. The parameter adjustment method of the display module, the electronic device, the parameter adjustment system of the display module, the display module, the display device, the computer-readable storage medium, and the computer program product are described below.

As shown in FIG. 1, some embodiments of the present disclosure provide a display device 100. The display device 100 may be any device that displays images whether in motion (e.g., a video) or stationary (e.g., a static image), and whether textual or graphical. More specifically, it is anticipated that the embodiments may be implemented in a variety of electronic devices or associated with a variety of electronic devices. The electronic devices include (but are not limited to): mobile phones, wireless devices, personal data assistants (PDAs), hand-held or portable computers, GPS receivers/navigators, cameras, MP4 video players, video cameras, game consoles, watches, clocks, calculators, television monitors, flat panel displays, computer monitors, automobile displays (e.g., odometer displays), navigators, cockpit controllers and/or displays, displays of camera views (e.g., displays of rear-view cameras in vehicles), electronic photos, electronic billboards or signs, projectors, building structures, and packaging and aesthetic structures (e.g., displays for displaying an image of a piece of jewelry).

In some embodiments, the display device 100 includes a display module 110 and a housing 130.

Figure 2:
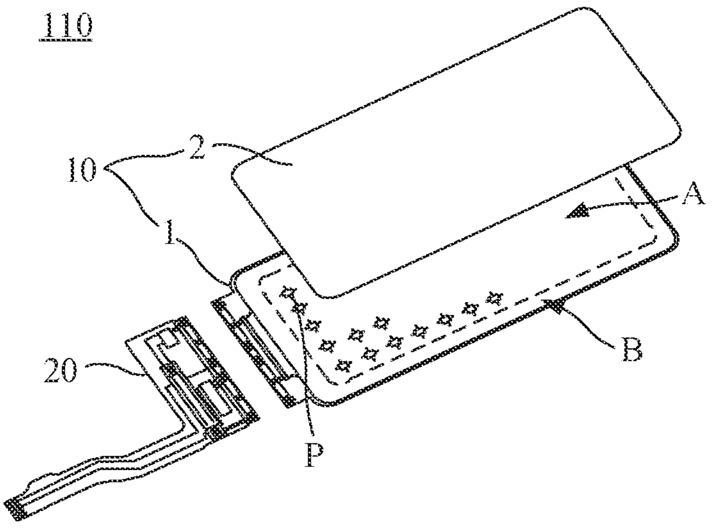
FIG. 2 is a structural diagram of a display module, in accordance with some embodiments.

In some embodiments, as shown in FIG. 2, the display module 110 includes a display panel 10, a flexible printed circuit board 20, a driver chip, and other electronic components.

The type of the display panel 10 may vary, which may be determined according to actual needs.

For example, the display panel 10 may be, an electroluminescent display panel, such as an organic light-emitting diode (OLED) display panel or a quantum dot light-emitting diode (QLED) display panel, which is not limited in the present disclosure.

Some embodiments of the present disclosure are schematically described below by taking an example in which the display panel 10 is an OLED display panel.

Figure 3:
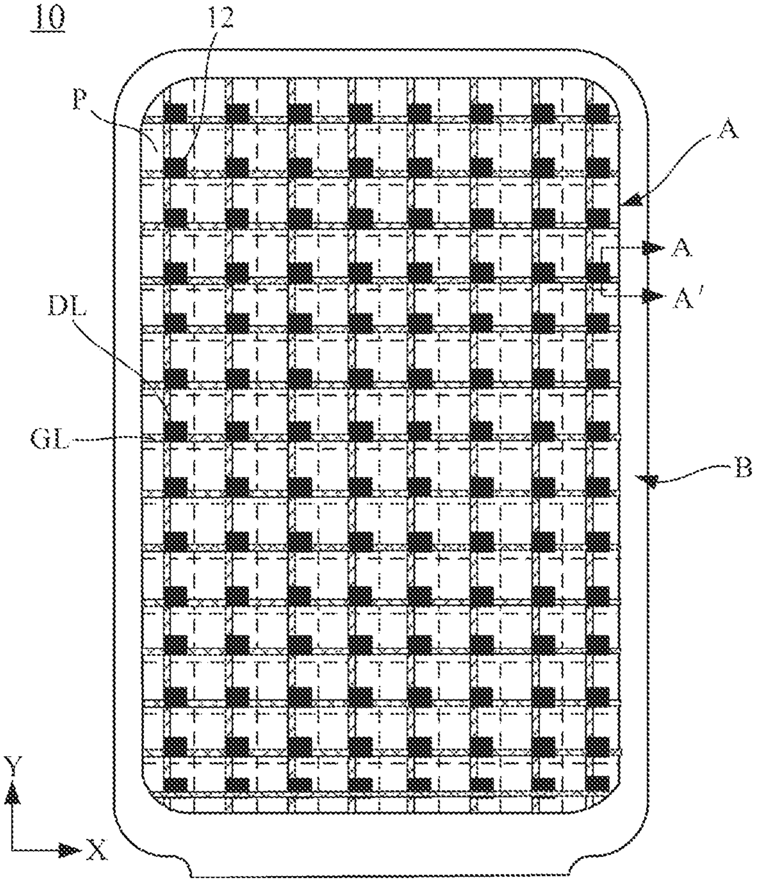
FIG. 3 is a structural diagram of a display panel, in accordance with some embodiments.

In some embodiments, as shown in FIGS. 2 and 3, the display panel 10 has a display area A and a peripheral area B disposed on at least one side of the display area. For example, as shown in FIGS. 2 and 3, the peripheral area B surrounds the display area A.

The display area A is an area for displaying images, and the display area A is configured to provide sub-pixels P therein. The peripheral area B is an area where no image is displayed, and the peripheral area B is configured to provide therein display driving circuits, e.g., a gate driving circuit and a source driving circuit.

For example, as shown in FIGS. 2 and 3, the display panel 10 includes a plurality of sub-pixels P disposed on a surface of a substrate 1 and located in the display area A. The plurality of sub-pixels P are arranged in rows and columns, each row includes sub-pixels P arranged in a first direction X, and each column includes sub-pixels P arranged in a second direction Y. Each row of sub-pixels P may include sub-pixels P, and each column of sub-pixels P may include sub-pixels P.

The first direction X and the second direction Y intersect. An angle between the first direction X and the second direction Y may be set according to actual needs. For example, the angle between the first direction X and the second direction Y is 85°, 89°, or 90°.

Figure 4:
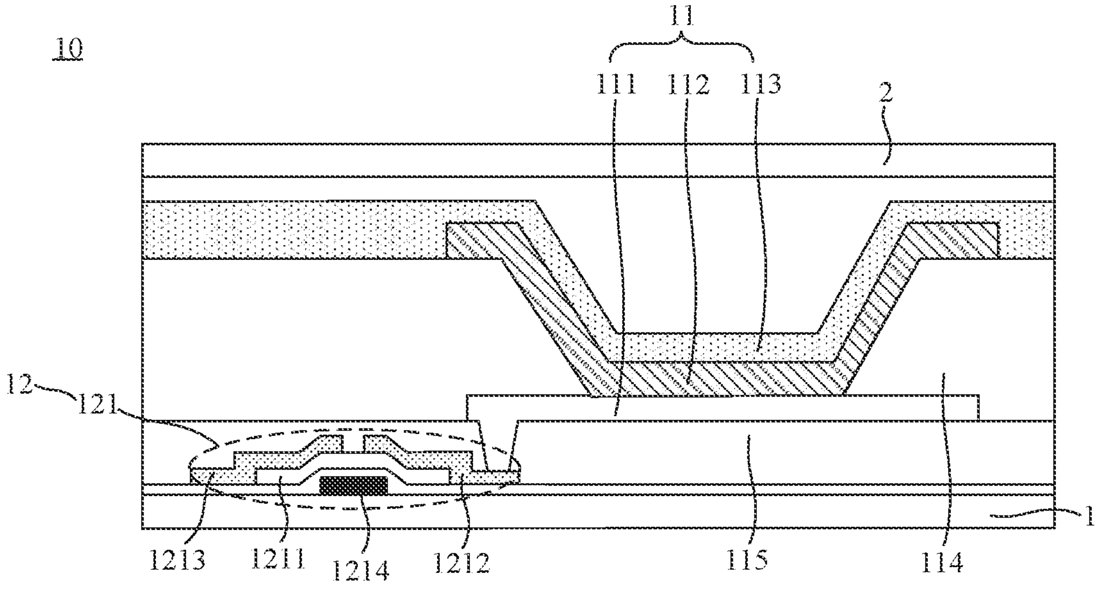
FIG. 4 is a sectional view of the display panel in FIG. 3 taken along the section line A-A'.

As shown in FIGS. 3 and 4, the sub-pixel P includes a light-emitting device 11 and a pixel driving circuit 12 that are disposed on the substrate 1, and the pixel driving circuit 12 includes a plurality of thin film transistors (TFTs) 121. The TFT 121 includes an active layer 1211, a source 1212, a drain 1213 and a gate 1214, and the source 1212 and the drain 1213 are in contact with the active layer 1211. The light-emitting device 11 includes a first electrode layer 111, a light-emitting function layer 112, and a second electrode layer 113 that are disposed sequentially in a direction perpendicular to the substrate 1 and away from the substrate 1. The first electrode layer 111 is electrically connected to a source 1212 or a drain 1213 of a TFT in the plurality of TFTs 121 as a driving transistor. For example, as shown in FIG. 4, the first electrode layer 111 is electrically connected to the source 1212 of the TFT 121.

It will be noted that, the source 1212 and the drain 1213 may interchange positions, that is, the position marked as "1212" in FIG. 4 indicates the drain, and the position marked as "1213" in FIG. 4 indicates the source.

In some embodiments, the light-emitting function layer 112 includes only a light-emitting layer. In some other embodiments, the light-emitting function layer 112 includes the light-emitting layer, and further includes at least one of an electron transport layer (ETL), an electron injection layer (EIL), a hole transport layer (HTL), and a hole injection layer (HIL).

In some embodiments, as shown in FIG. 4, the display panel 10 further includes a pixel defining layer 114. The pixel defining layer 114 includes a plurality of openings, and a single light-emitting device 11 corresponds to a respective opening.

In some embodiments, as shown in FIG. 4, the display panel 10 further includes a first planarization layer 115 disposed between the TFTs 121 and the first electrode layer 111.

In some embodiments, as shown in FIG. 4, the display panel 10 further includes an encapsulation layer 2 disposed on a side of the light-emitting device 11 away from the substrate 1. The encapsulation layer 2 may be an encapsulation film, and may also be an encapsulation cover plate.

In some embodiments, as shown in FIGS. 2 and 3, the display panel 10 may further include a plurality of gate lines GL and a plurality of data lines DL that are disposed on the surface of the substrate 1 and located in the display area A. The plurality of gate lines GL extend in the first direction X, and the plurality of data lines DL extend in the second direction Y.

For example, sub-pixels P arranged in a line in the first direction X may be referred to as sub-pixels P in a same row, and sub-pixels P arranged in a line in the second direction Y may be referred to as sub-pixels P in a same column. The sub-pixels P in the same row may be electrically connected to a gate line GL, and the sub-pixels P in the same column may be electrically connected to a data line DL.

The gate line GL may be electrically connected to pixel driving circuits 12 of the sub-pixels P in the same row, and the data line DL may be electrically connected to pixel driving circuits 12 of the sub-pixels P in the same column.

In the pixel driving circuit, a scan transistor and a reset transistor are turned off for most of time, thus requiring a low leakage speed; a switching transistor and the driving transistor are turned on for most of time, thus requiring a high charge mobility. In combination of advantages of a high stability and a low fabrication cost of an indium gallium zinc oxide (IGZO) TFT at a low refresh rate and a high charge mobility of a low temperature poly-silicon (LTPS) TFT, a low temperature polycrystalline oxide (LTPO) pixel driving circuit is provided.

In the LTPO pixel driving circuit, the scan transistor and the reset transistor adopt N-type IGZO TFTs, and the switching transistor and the driving transistor adopt LTPS TFTs. In this way, it may be possible to achieve high charge mobility, stability and scalability at low fabrication costs.

Figure 5:
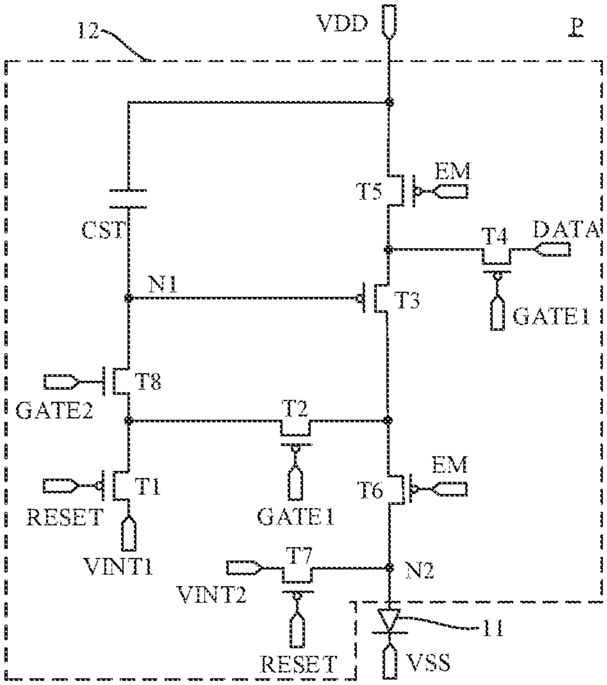
FIG. 5 is a circuit diagram of a sub-pixel, in accordance with some embodiments.
Figure 6:
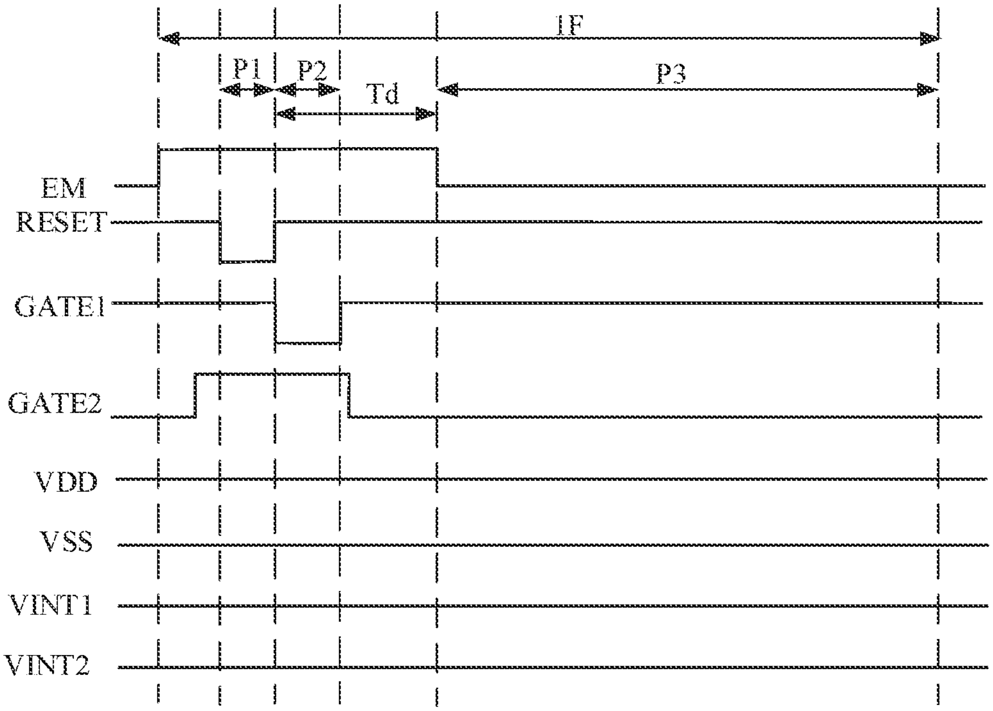
FIG. 6 is a timing diagram of a pixel driving circuit, in accordance with some embodiments.

The structure of the pixel driving circuit may vary, which may be determined according to actual needs. With reference to FIGS. 5 and 6, the structure and operation process of the sub-pixel P are schematically described below by taking an example in which the LTPO pixel driving circuit includes eight transistors T and one capacitor CST.

For example, as shown in FIG. 5, the pixel driving circuit 12 includes eight transistors T and one capacitor CST. Control electrodes of a first transistor T1 and a seventh transistor T7 of the pixel driving circuit 12 are both coupled to a reset signal terminal RESET, control electrodes of a second transistor T2 and a fourth transistor T4 are both coupled to a first scan signal terminal GATE1, and a control electrode of an eighth transistor T8 is coupled to a second scan signal terminal GATE2. The first transistor T1 and the seventh transistor T7 are reset transistors, and the second transistor T2, the fourth transistor T4 and the eighth transistor T8 are scan transistors. A control electrode of a third transistor T3 is coupled to a terminal of the capacitor CST, and control electrodes of the fifth transistor T5 and the sixth transistor T6 are both coupled to an enable signal terminal EM. The third transistor T3 is the driving transistor, and the fifth transistor T5 and the sixth transistor T6 are switching transistors. The first transistor T1, the second transistor T2, the third transistor T3, the fourth transistor T4, the fifth transistor T5, the sixth transistor T6, and the seventh transistor T7 are all P-type LTPS TFTs, and the eighth transistor T8 is an N-type IGZO TFT.

A frame (illustrated as 1F in FIG. 6) includes a reset period P1, a charging period P2, and a light-emitting period P3.

In the reset period P1, the first transistor T1 and the seventh transistor T7 are turned on under control of a reset signal from the reset signal terminal RESET, the eighth transistor T8 is turned on under control of a second scan signal from the second scan signal terminal GATE2, a voltage of a first node N1 is reset to a voltage of an initialization voltage signal from a first initialization signal terminal VINT1, and a voltage of a second node N2 is reset to a voltage of an initialization voltage signal from a second initialization signal terminal VINT2.

In the charging period P2, the second transistor T2 and the fourth transistor T4 are turned on under control of a first scan signal from the first scan signal terminal GATE1, the eighth transistor T8 is turned on under control of the second scan signal from the second scan signal terminal GATE2, the third transistor T3 is turned on under control of the voltage of the first node N1, and a data signal from the data signal terminal DATA is written into the capacitor CST.

In the light-emitting period P3, the fifth transistor T5 and the sixth transistor T6 are turned on under control of an enable signal of the enable signal terminal EM, and the third transistor T3 is turned on under control of the voltage of the first node N1, so that a driving current signal is output to the light-emitting device.

Figure 7:
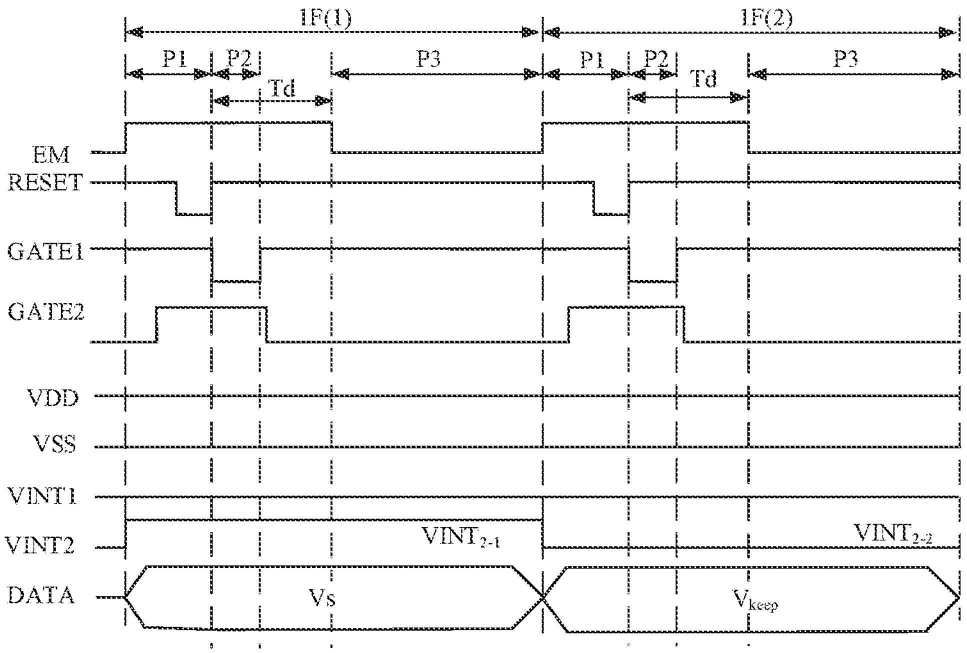
FIG. 7 is a timing diagram of a pixel driving circuit, in accordance with some other embodiments.

In order to reduce the power consumption of the display panel 10, the display panel 10 has a high frequency driving mode and a low frequency driving mode. The low frequency driving mode is used for the display of the static image. In the low frequency driving mode, a low frequency cycle includes a refresh frame and a plurality of keep frames. It will be noted that one refresh frame may be one frame as described above, and one keep frame may be one frame as described above. As shown in FIG. 7, one refresh frame and one keep frame are taken as an example.

However, in the low frequency driving mode, since a refresh frequency of the display panel is reduced, human eyes are more sensitive to flicker of an image displayed on the display panel, which results in a problem that human eyes sense the flicker of the image displayed on the display panel.

According to research, referring to FIGS. 6 and 7, a flicker value of an image is affected by parameters such as a light-emitting delay time Td (i.e., a time interval between a start of the charging period of the frame and a start of the light-emitting period of the frame), a voltage of the anode of the light-emitting device, and a keep voltage $V_{keep}$ from the data signal terminal received by the source of the driving transistor T3 during the keep frame 1F(2). In a case where an image with a low flicker value is required, the parameters required by display panels 10 (referring to FIG. 2) with different line arrangements may not be exactly same.

As shown in FIGS. 5, 6 and 7, the light-emitting delay time Td is also a characteristic recovery time of the driving transistor T3, the length of the characteristic recovery time affects a state of the driving transistor T3 and in turn affects a brightness of the light-emitting device 11. The voltage of the anode of the light-emitting device 11 in a frame (e.g., a voltage of the initialization signal (i.e., a first initialization sub-signal $VINT_{2-1}$) received by the light-emitting device 11 during the refresh frame 1F(1), or a voltage of the initialization signal (i.e., a second initialization sub-signal $VINT_{2-2}$) received by the light-emitting device 11 during the keep frame 1F(2)) affects a turned-on speed of the light-emitting device 11. As a result, the final brightness of the light-emitting device 11 is affected. The keep voltage $V_{keep}$ from the data signal terminal received during the keep frame 1F(2) also affects the state of the driving transistor T3, thus affecting the brightness of the light-emitting device 11.

Figure 8:
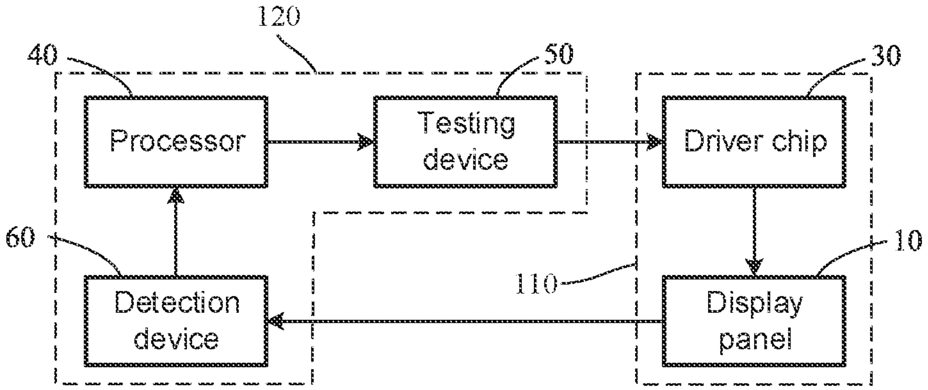
FIG. 8 is a structural block diagram of a parameter adjustment system and a display module, in accordance with some embodiments.

In light of this, referring to FIG. 8, a driver chip 30 included in the display module 110 in the embodiments of the present disclosure stores a preferred value PR Td of the light-emitting delay time. The driver chip 30 is configured to generate light-emitting signals according to the preferred value PR Td of the light-emitting delay time, and transmit the light-emitting signals to the display panel 10, so as to drive the display panel 10 to emit light. In this case, a floating of the brightness of the image displayed on the display panel 10 in the low frequency driving mode may be reduced, thus reducing the flicker value of the display panel 10 and ameliorating the problem that the human eyes sense the flicker of the image displayed on the display panel.

The preferred value PR Td of the light-emitting delay time may be obtained according to the parameter adjustment method of the display module 110 provided in the embodiments of the present disclosure, reference may be made to the following description, and details will not be provided here.

In some embodiments, the driver chip 30 further stores at least one of a preferred value PR $VINT_{2-1}$ of the first initialization sub-signal, a preferred value PR $VINT_{2-2}$ of the second initialization sub-signal, and a preferred value PR $V_{keep}$ of a data keep signal. For example, the driver chip 30 further stores the preferred value PR $VINT_{2-1}$ of the first initialization sub-signal, the preferred value PR $VINT_{2-2}$ of the second initialization sub-signal, and the preferred value PR $V_{keep}$ of the data keep signal. In this case, the driver chip 30 is configured to: generate the light-emitting signals according to the preferred value PR Td of the light-emitting delay time, the preferred value PR $VINT_{2-1}$ of the first initialization sub-signal, the preferred value PR $VINT_{2-2}$ of the second initialization sub-signal, and the preferred value PR $V_{keep}$ of the data keep signal, and transmit the light-emitting signals to the display panel 10, so as to drive the display panel 10 to emit light. In this case, the turned-on speed of the light-emitting device 11 may be controlled by the preferred value PR $VINT_{2-1}$ of the first initialization sub-signal and the preferred value PR $VINT_{2-2}$ of the second initialization sub-signal, so as to adjust the final brightness of the light-emitting device 11. Thus, the flicker value of the display panel 10 is reduced, and the problem that the human eyes sense the flicker of the image displayed on the display panel is ameliorated. In addition, the voltage of the source of the driving transistor T3 may be controlled by the preferred value PR $V_{keep}$ of the data keep signal, so that the state of the driving transistor T3 is adjusted, and the final brightness of the light-emitting device 11 is adjusted. Therefore, it may further reduce the flicker value of the display panel 10, and ameliorate the problem that the human eyes sense the flicker of the image displayed on the display panel.

The preferred value PR $VINT_{2-1}$ of the first initialization sub-signal, the preferred value PR $VINT_{2-2}$ of the second initialization sub-signal, and the preferred value PR $V_{keep}$ of the data keep signal may be obtained according to the parameter adjustment method of the display module 110 provided in the embodiments of the present disclosure, reference may be made to the following description, and details will not be provided here.

Some embodiments of the present disclosure provide the parameter adjustment method of the display module 110. Based on this method, referring to FIGS. 7 and 8, the display module 110 is capable of operating in the low frequency driving mode. The low frequency driving mode includes a plurality of low frequency cycles, and a low frequency cycle includes one refresh frame 1F(1) and at least one keep frame 1F(2).

Figure 9:
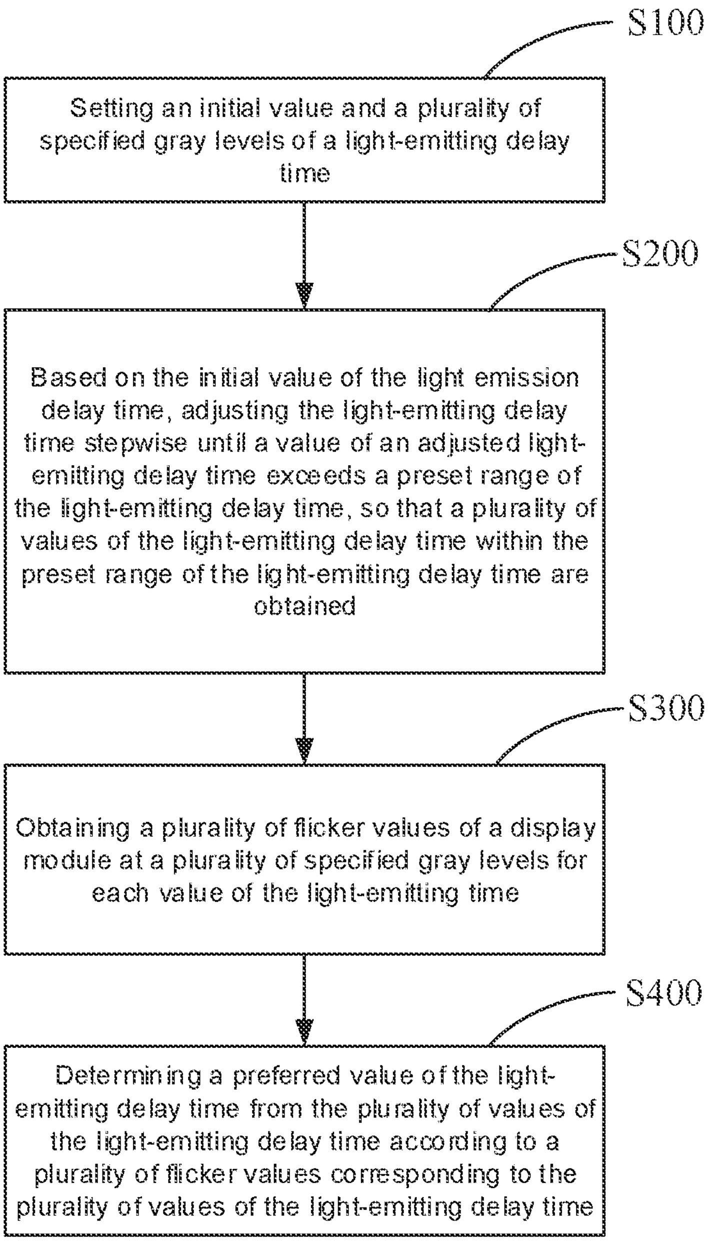
FIGS. 9 to 18 are flow diagrams of a parameter adjustment method of a display module, in accordance with some embodiments.

Based on this, as shown in FIG. 9, the parameter adjustment method includes S100 to S400.

In S100, an initial value $Td_0$ of the light-emitting delay time and a plurality of specified gray levels 1 to S are set.

Figure 19:
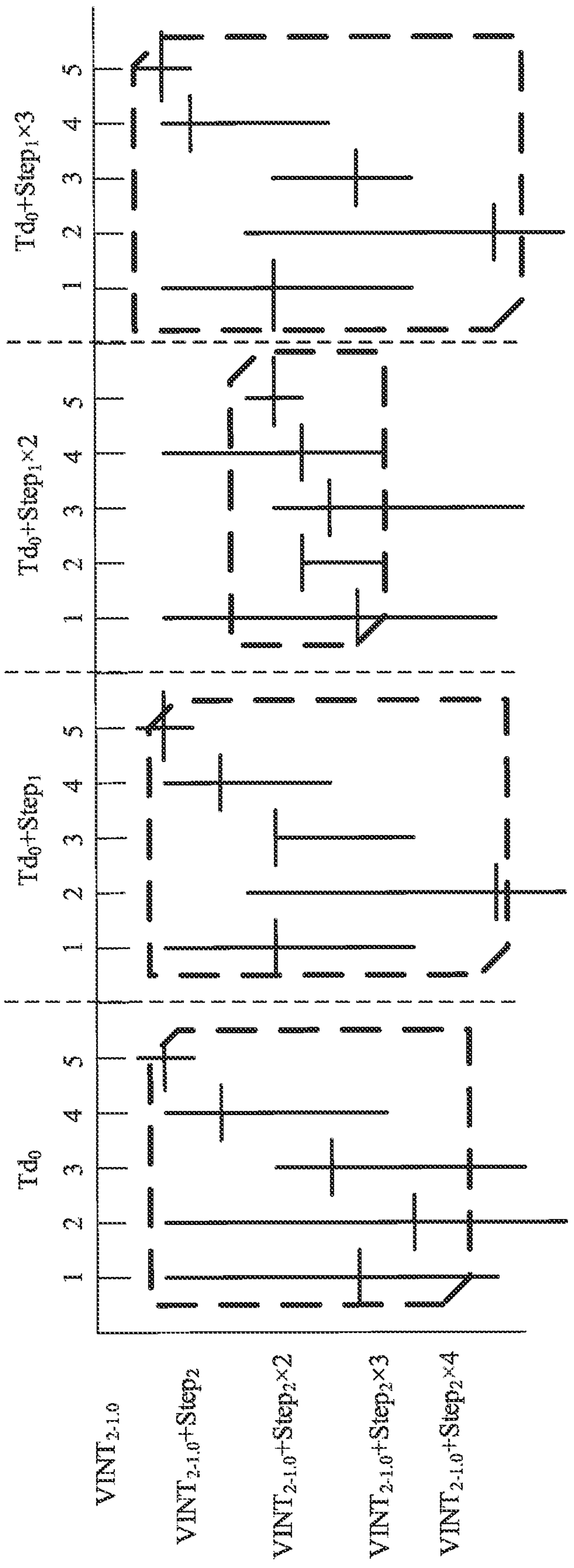
FIG. 19 is a data diagram of flicker values of a display module at a plurality of specified gray levels for a plurality of values of a light-emitting delay time and a plurality of values of a first initialization sub-signal, in accordance with some embodiments.

In the above step. S is greater than or equal to 1 (S≥1), and S is a positive integer. The initial value $Td_0$ of the light-emitting delay time may be in a range from 0 to 30 times a row scan time period. For example, the initial value $Td_0$ of the light-emitting delay time is any one of 0 times the row scan time period, 10 times the row scan time period, and 30 times the row scan time period. The plurality of specified gray levels 1 to S may be selected according to actual needs, which is not limited in the present disclosure. As shown in FIG. 19, five specified gray levels are taken as an example.

It will be noted that, the row scan time period=1 second÷the refresh frequency÷the number of scanned rows. For example, the refresh frequency of the display panel is 120 Hz, the number of scanned rows is 1000, and the row scan time period is 0.0083 ms.

In S200, based on the initial value $Td_0$ of the light-emitting delay time, the light-emitting delay time Td is adjusted stepwise until a value $Td_m$ of an adjusted light-emitting delay time exceeds a preset range of the light-emitting delay time, so that a plurality of values $Td_0$ to $Td_{m-1}$ of the light-emitting delay time within the preset range of the light-emitting delay time Td are obtained.

In the above step, m is greater than or equal to 1 (m≥1), and m is a positive integer. The preset range of the light-emitting delay time Td may be 0 to 30 times the row scan time period. Adjusting the light-emitting delay time Td stepwise may be that, based on the initial value $Td_0$ of the light-emitting delay time, adjusting the light-emitting delay time Td from low to high or high to low according to the first set step value $Step_1$, and a single value $Td_m$ of the light-emitting delay time after each adjustment is obtained. The first set step value $Step_1$ may be 1 times the row scan time period (1 h) to 5 h; for example, the first set step value $Step_1$ may be any one of 1 h, 2 h, 3 h, 4 h, and 5 h.

For example, the initial value $Td_0$ of the light-emitting delay time is 0 times the row scan time period, and the first set step value $Step_1$ is 1 h. In this case, the light-emitting delay time Td is adjusted from low to high for 1 h each time until the value $Td_m$ of the light-emitting delay time after the adjustment is greater than 30 h.

For example, the initial value $Td_0$ of the light-emitting delay time is 30 times the row scan time period, and the first set step value $Step_1$ is 5 h. In this case, the light-emitting delay time Td is adjusted from high to low for 5 h each time until the value $Td_m$ of the light-emitting delay time after the adjustment is less than 0 h.

In S300, for each value of the values ($Td_0$ to $Td_{m-1}$) of the light-emitting delay time Td, a plurality of flicker values of the display module 110 at the plurality of specified gray levels 1 to S are obtained.

In the above step, before each stepwise adjustment of the light-emitting delay time Td, for a value of the light-emitting delay time Td obtained before each stepwise adjustment, a plurality of flicker values of the display module 110 at the plurality of specified gray levels 1 to S may be obtained.

That is, during the process of adjusting the light-emitting delay time Td stepwise, the plurality of flicker values at the plurality of specified gray levels 1 to S for the value of the light-emitting delay time Td before each adjustment are simultaneously obtained. Therefore, when the plurality of values $Td_0$ to $Td_{m-1}$ of the light-emitting delay time are obtained, the plurality of flicker values of the display module 110 at the plurality of specified gray levels 1 to S for each value of the values ($Td_0$ to $Td_{m-1}$) of the light-emitting delay time Td are obtained.

The plurality of flicker values of the display module 110 at the plurality of specified gray levels 1 to S may be flicker values of the display module 110 at the plurality of specified gray levels 1 to S for an initial value $VINT_{2-1.0}$ of the first initialization sub-signal, or may be flicker values of the display module at the plurality of specified gray levels 1 to S for a plurality of values of the first initialization sub-signal $VINT_{2-1}$. As for details, reference may be made to the following description, which will not be provided here. The first initialization sub-signal $VINT_{2-1}$ is the initialization signal received by the light-emitting device 11 during the refresh frame.

In S400, a preferred value PR Td of the light-emitting delay time is determined from the plurality of values $Td_0$ to $Td_{m-1}$ of the light-emitting delay time according to a plurality of flicker values corresponding to the plurality of values $Td_0$ to $Td_{m-1}$ of the light-emitting delay time.

In the above step, a method for determining the preferred light-emitting delay time PR Td from the plurality of values $Td_0$ to $Td_{m-1}$ of the light-emitting delay time in a case where the flicker values of the display module 110 at the plurality of specified gray levels 1 to S for the initial value $VINT_{2-1.0}$ of the first initialization sub-signal are obtained is not the same as a method for determining the preferred value PR Td of the light-emitting delay time from the plurality of values $Td_0$ to $Td_{m-1}$ of the light-emitting delay time in a case where the flicker values of the display module 110 at the plurality of specified gray levels 1 to S for the plurality of values of the first initialization sub-signal $VINT_{2-1}$. As for details, reference may be made to the following description, which will not be provided here.

The preferred value PR Td of the light-emitting delay time may be stored in the driver chip 30, which may generate light-emitting signals according to the preferred light-emitting delay time PR Td, and transmit the light-emitting signals to the display panel 10, so as to drive the display panel 10 to emit light. In this case, it may be possible to reduce the floating of the brightness of the image displayed on the display panel 10 in the low frequency driving mode, reduce the flicker value of the display panel 10, and ameliorate the problem that the human eyes sense the flicker of the image displayed on the display panel.

Figure 10:
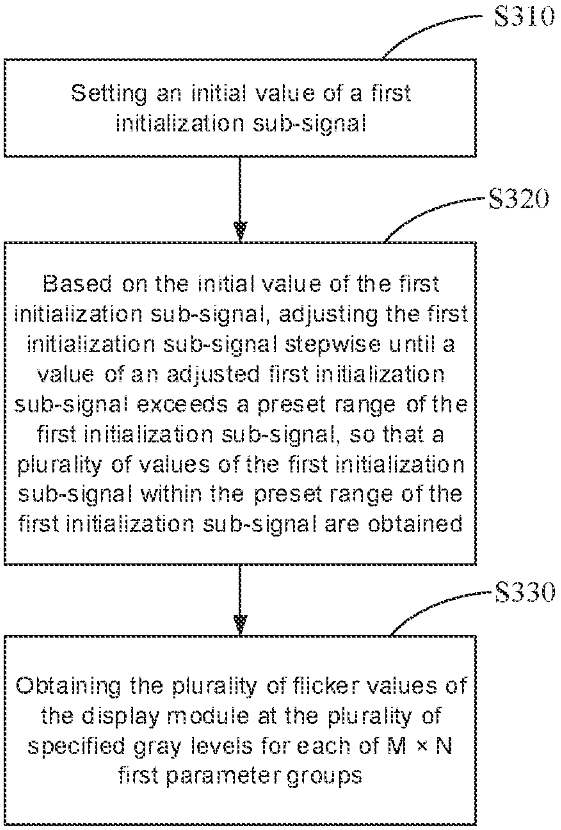

In some embodiments, as shown in FIG. 10, S300 includes S310 to S330.

In S310, the initial value $VINT_{2-1.0}$ of the first initialization sub-signal is set.

In the above step, the first initialization sub-signal $VINT_{2-1}$ is the initialization signal received by the light-emitting device during the refresh frame. The initial value $VINT_{2-1.0}$ of the first initialization sub-signal may be in a range from −6 V to −1 V. For example, the initial value $VINT_{2-1.0}$ of the first initialization sub-signal may be any one of −1 V, −3 V, −5 V, and −6 V.

In S320, based on the initial value $VINT_{2-1.0}$ of the first initialization sub-signal, the first initialization sub-signal $VINT_{2-1}$ is adjusted stepwise until a value $VINT_{2-1.n}$ of an adjusted first initialization sub-signal exceeds a preset range of the first initialization sub-signal $VINT_{2-1}$, so that a plurality of values $VINT_{2-1.0}$ to $VINT_{2-1.n-1}$ of the first initialization sub-signal within the preset range of the first initialization sub-signal $VINT_{2-1}$ are obtained.

In the above step, n is greater than or equal to 1 ($n \geq 1$), and n is a positive integer. The number of the plurality of values $Td_0$ to $Td_{m-1}$ of the light-emitting delay time is M, the number of the plurality of values $VINT_{2-1.0}$ to $VINT_{2-1.n-1}$ of the first initialization sub-signal is N. The M values $Td_0$ to $Td_{m-1}$ of the light-emitting delay time and the N values $VINT_{2-1.0}$ to $VINT_{2-1.n-1}$ of the first initialization sub-signal are divided into M×N first parameter groups, and a first parameter group includes a single value of the light-emitting delay time Td and a single value of the first initialization sub-signal $VINT_{2-1}$.

In addition, the preset range of the first initialization sub-signal $VINT_{2-1}$ is from −6 V to −1 V. Adjusting the first initialization sub-signal $VINT_{2-1}$ stepwise means that, based on the initial value $VINT_{2-1.0}$ of the first initialization sub-signal, the first initialization sub-signal $VINT_{2-1}$ is adjusted from low to high or high to low according to a second set step value $Step_2$, and a value $VINT_{2-1.n}$ of the first initialization sub-signal after each adjustment is obtained. The second set step value $Step_2$ may be in a range from 0.1 V to 0.5 V; for example, the second set step value $Step_2$ may be any one of 0.1 V, 0.2 V, 0.3 V. 0.4 V, and 0.5 V.

For example, the initial value $VINT_{2-1.0}$ of the first initialization sub-signal is-6 V, and the second set step value $Step_2$ is 0.1 V. In this case, the first initialization sub-signal $VINT_{2-1}$ is adjusted from low to high for 0.1 V each time until the value $VINT_{2-1.n}$ of the first initialization sub-signal after the adjustment is greater than −1 V.

For example, the initial value $VINT_{2-1.0}$ of the first initialization sub-signal is −1 V, and the second set step value $Step_2$ is 0.5 V. In this case, the first initialization sub-signal $VINT_{2-1}$ is adjusted from high to low for 0.5 V each time until the value $VINT_{2-1.n}$ of the first initialization sub-signal after the adjustment is less than-6 V.

In S330, the plurality of flicker values of the display module 110 at the plurality of specified gray levels 1 to S for each first parameter group of the M×N first parameter groups are obtained.

In the above step, before each stepwise adjustment of the light-emitting delay time Td, for a value of the light-emitting delay time Td obtained before the adjustment, flicker values of the display module 110 at the plurality of specified gray levels 1 to S for the N values of the first initialization sub-signal $VINT_{2-1}$ are obtained.

That is, during the process of adjusting the light-emitting delay time Td stepwise, the first initialization sub-signal $VINT_{2-1}$ is stepwise adjusted before each adjustment of the light-emitting delay time Td; and before each stepwise adjustment of the first initialization sub-signal $VINT_{2-1}$, flicker values of the display module 110 at the plurality of specified gray levels 1 to S for a value of the first initialization sub-signal $VINT_{2-1}$ obtained before the adjustment are obtained simultaneously. Therefore, when the plurality of values $Td_0$ to $Td_{m-1}$ of the light-emitting delay time are obtained, the plurality of flicker values of the display module 110 at the plurality of specified gray levels 1 to S for each first parameter group of the M×N first parameter groups are obtained at the same time.

Figure 11:
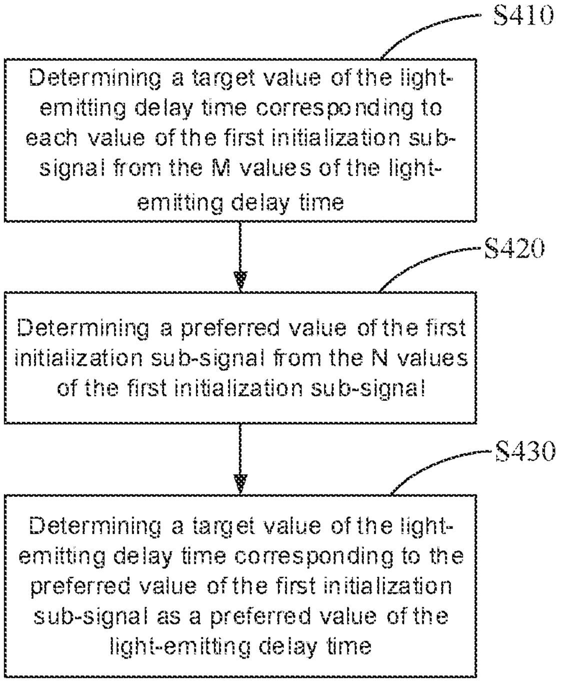

Flicker values corresponding to a single first parameter group constitute a single set of flicker values. On this basis, as shown in FIG. 11, S400 includes S410 to S430.

In S410, a target value AM Td of the light-emitting delay time corresponding to each value of the values ($VINT_{2-1.0}$ to $VINT_{2-1.n-1}$) of the first initialization sub-signal $VINT_{2-1}$ is determined from the M values $Td_0$ to $Td_{m-1}$ of the light-emitting delay time.

In the above step, the target value AM Td of the light-emitting delay time is a value of the light-emitting delay time Td corresponding to a set of flicker values with a highest convergence in M sets of flicker values, and the M sets of flicker values corresponds to the M values of the light-emitting delay time and each include the value of the first initialization sub-signal $VINT_{2-1}$.

For example, as shown in FIG. 19, the convergence of the set of flicker values may be determined by variance. The smaller the variance, the higher the convergence. For example, the value of the first initialization sub-signal is ($VINT_{2-1.0}+Step_2\times3$), the target value AM Td of the light-emitting delay time corresponding thereto is ($Td_0+Step_1\times2$). Here, a flicker value corresponding to the value ($VINT_{2-1.0}+Step_2\times3$) is an intersection point shown in FIG. 19.

In S420, a preferred value PR $VINT_{2-1}$ of the first initialization sub-signal is determined from the N values $VINT_{2-1.0}$ to $VINT_{2-1.n-1}$ of the first initialization sub-signal.

In the above step, the preferred value PR $VINT_{2-1}$ of the first initialization sub-signal is determined, so as to determine the preferred value PR Td of the light-emitting delay time according to the preferred value PR $VINT_{2-1}$ of the first initialization sub-signal in S430. As for the process of determining the preferred value PR $VINT_{2-1}$ of the first initialization sub-signal, reference may be made to the following description, and details will not be provided here.

In S430, a target value AM Td of the light-emitting delay time corresponding to the preferred value PR $VINT_{2-1}$ of the first initialization sub-signal is determined as the preferred value PR Td of the light-emitting delay time.

In the above step, according to target values AM Td of the light-emitting delay time corresponding to the values of the first initialization sub-signal $VINT_{2-1}$ obtained in the S410, the target value AM Td of the light-emitting delay time corresponding to the preferred value PR $VINT_{2-1}$ of the first initialization sub-signal is determined as the preferred value PR Td of the light-emitting delay time.

Figure 12:
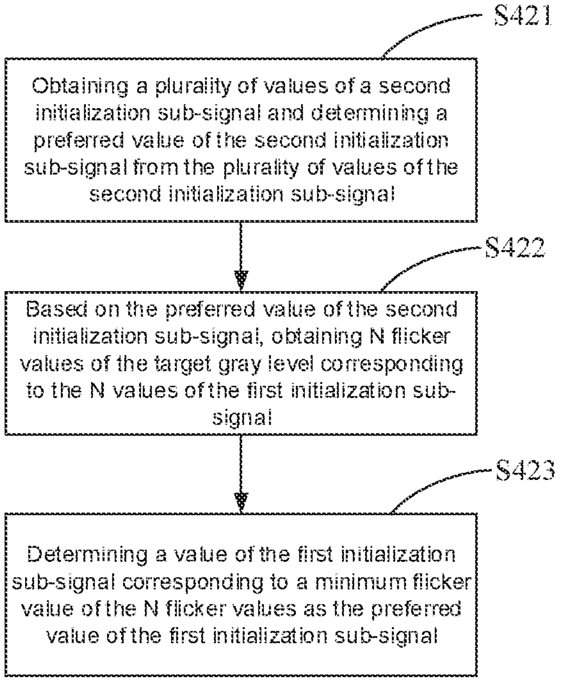

In some embodiments, as shown in FIG. 12, S420 includes S421 to S423.

In S421, a plurality of values $VINT_{2-2.0}$ to $VINT_{2-2.k-1}$ of the second initialization sub-signal are obtained, and a preferred value PR $VINT_{2-2}$ of the second initialization sub-signal is determined from the plurality of values of the second initialization sub-signal.

In the above step, k is greater than or equal to 1 ($k \geq 1$), and k is a positive integer. The second initialization sub-signal $VINT_{2-2}$ is the initialization signal received by the light-emitting device 11 during the keep frame. As for the process of obtaining the plurality of values $VINT_{2-2.0}$ to $VINT_{2-2.k-1}$ of the second initialization sub-signal and determining the preferred value PR $VINT_{2-2}$ of the second initialization sub-signal from the plurality of values $VINT_{2-2.0}$ to $VINT_{2-2.k-1}$ of the second initialization sub-signal, reference may be made to the following description, and details will not be provided here.

In S422, for the preferred value PR $VINT_{2-2}$ of the second initialization sub-signal, N flicker values at a target gray level corresponding to the N values $VINT_{2-1.0}$ to $VINT_{2-1.n-1}$ of the first initialization sub-signal are obtained.

In the above step, the second initialization sub-signal $VINT_{2-2}$ is the initialization signal received by the light-emitting device 11 during the keep frame, and the target gray level is one of the plurality of specified gray levels 1 to S. In general, in a case where a flicker value at the target gray level corresponding to the preferred value PR $VINT_{2-2}$ of the second initialization sub-signal meets the requirements, flicker values at other gray levels of the plurality of specified gray levels 1 to S also meet the requirements. Target gray levels corresponding to different line arrangements may be different. The target gray level may be selected according to actual line arrangements, or may be set according to experimental values, or may be determined based on the plurality of flicker values. As for details, reference may be made to the following description, which will not be provided here.

In addition, the N flicker values at the target gray level corresponding to the N values $VINT_{2-1.0}$ to $VINT_{2-1.n-1}$ of the first initialization sub-signal for the preferred value PR $VINT_{2-2}$ of the second initialization sub-signal are determined by performing S4213; as for details, reference may be made to the following description, which will not be provided here.

In S423, a value of the first initialization sub-signal $VINT_{2-1}$ corresponding to a minimum flicker value of the N flicker values is determined as the preferred value PR $VINT_{2-1}$ of the first initialization sub-signal.

Figure 21:
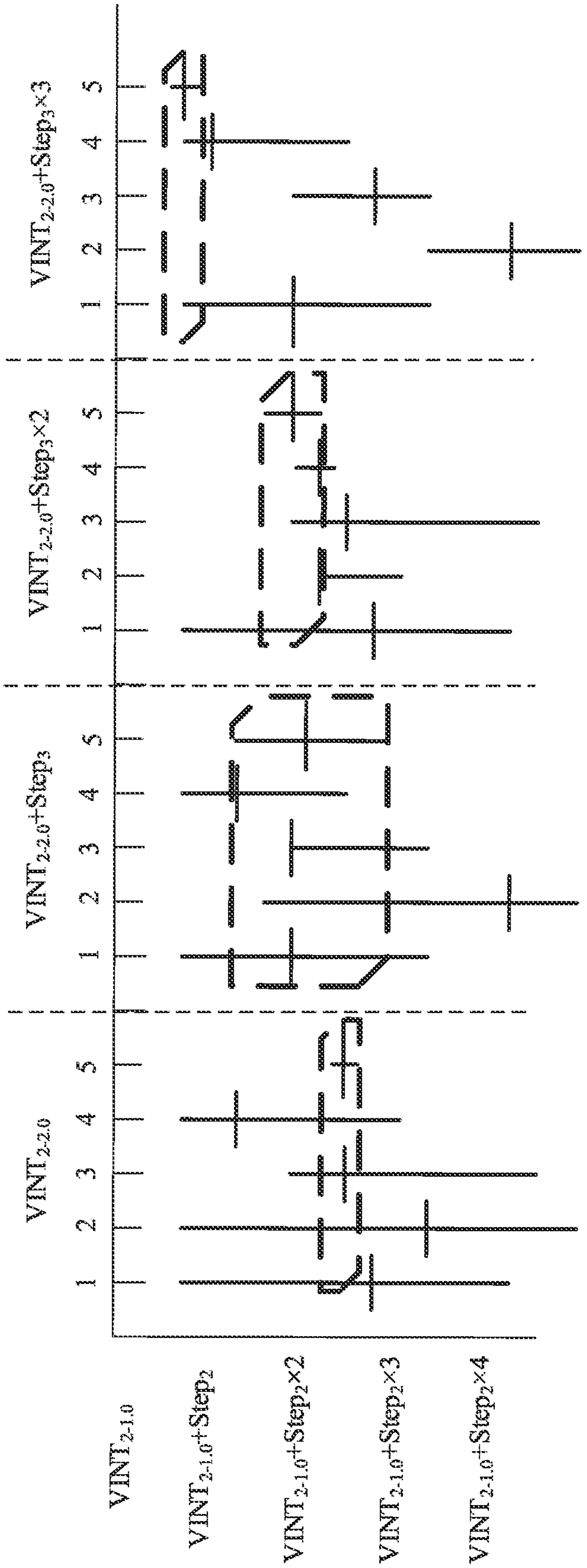
FIG. 21 is a data diagram of flicker values of a display module at a plurality of specified gray levels for a plurality of values of a first initialization sub-signal and a plurality of values of a second initialization sub-signal, in accordance with some embodiments.

In the above step, as shown in FIG. 21, in a case where the preferred value PR $VINT_{2-2}$ of the second initialization sub-signal is ($VINT_{2-2.0}+Step_3 \times 3$), the preferred value PR $VINT_{2-1}$ of the first initialization sub-signal is ($VINT_{2-1.0}+Step_2 \times 2$).

Figure 13:
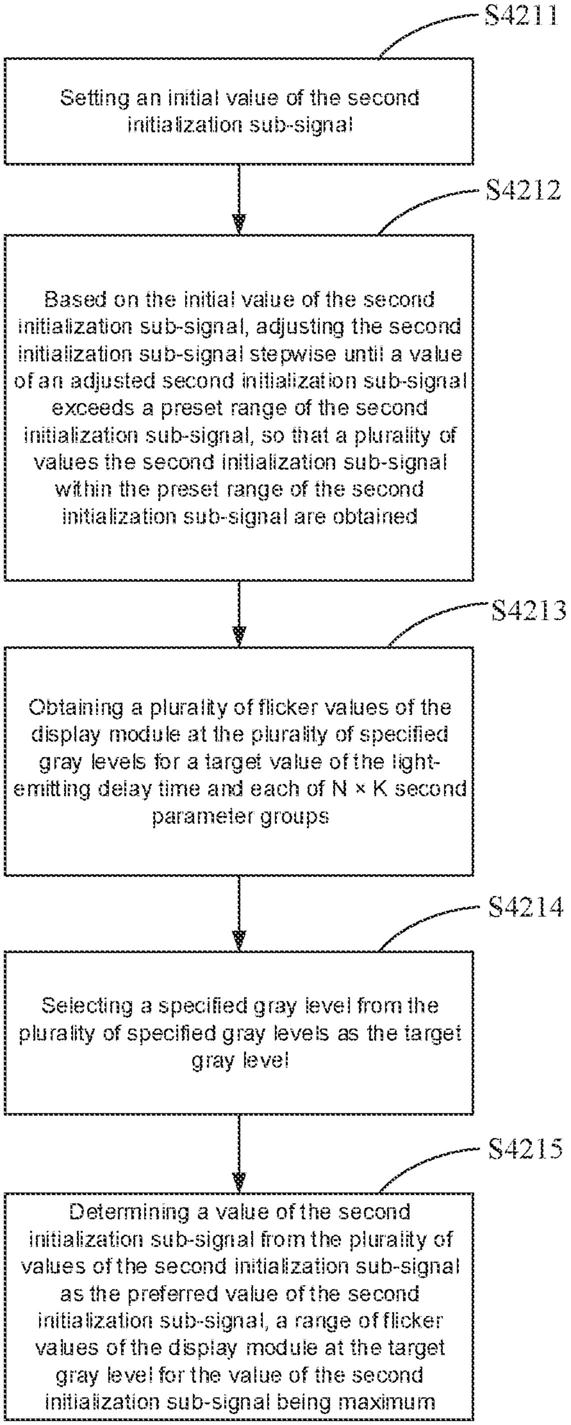

In some embodiments, as shown in FIG. 13, S421 includes S4211 to S4215.

In S4211, the initial value $VINT_{2-2.0}$ of the second initialization sub-signal is set.

In the above step, the initial value $VINT_{2-2.0}$ of the second initialization sub-signal may be in a range from −6 V to −1 V. For example, the initial value $VINT_{2-2.0}$ of the second initialization sub-signal may be any one of −1 V, −3 V, −5 V, and −6 V.

In S4212, based on the initial value $VINT_{2-2.0}$ of the second initialization sub-signal, the second initialization sub-signal $VINT_{2-2}$ is adjusted stepwise until a value $VINT_{2-2.k}$ of an adjusted second initialization sub-signal exceeds the preset range of the second initialization sub-signal $VINT_{2-2}$, so that the plurality of values $VINT_{2-2.0}$ to $VINT_{2-2.k-1}$ of the second initialization sub-signal within the preset range of the second initialization sub-signal $VINT_{2-2}$ are obtained.

In the above step, $k \geq 1$, and k is a positive integer. The number of the values $VINT_{2-1.0}$ to $VINT_{2-1.n-1}$ of the first initialization sub-signal is N, the number of the plurality of values $VINT_{2-2.0}$ to $VINT_{2-2.k-1}$ of the second initialization sub-signal is K. The N values $VINT_{2-1.0}$ to $VINT_{2-1.n-1}$ of the first initialization sub-signal and the K values $VINT_{2-2.0}$ to $VINT_{2-2.k-1}$ of the second initialization sub-signal are divided into N×K second parameter groups, and a second parameter group includes a single value of the first initialization sub-signal $VINT_{2-1}$ and a single value of the second initialization sub-signal $VINT_{2-2}$.

In addition, the preset range of the second initialization sub-signal $VINT_{2-2}$ is from −6 V to −1 V. Adjusting the second initialization sub-signal $VINT_{2-2}$ stepwise means that, based on the initial value $VINT_{2-2.0}$ of the second initialization sub-signal, the second initialization sub-signal $VINT_{2-2}$ is adjusted from low to high or high to low according to a third set step value $Step_3$, and a value $VINT_{2-2.k}$ of the second initialization sub-signal after each adjustment is obtained. The third set step value $Step_3$ may be in a range from 0.1 V to 0.5 V; for example, the third set step value $Step_3$ may be any one of 0.1 V, 0.2 V, 0.3 V, 0.4 V, and 0.5 V.

For example, the initial value $VINT_{2-2.0}$ of the second initialization sub-signal is −6 V, and the third set step value $Step_3$ is 0.1 V. In this case, the second initialization sub-signal $VINT_{2-2}$ is adjusted from low to high for 0.1 V each time until the value $VINT_{2-2.k}$ of the adjusted second initialization sub-signal is greater than-1 V.

For example, the initial value $VINT_{2-2.0}$ of the second initialization sub-signal is −1 V, and the third set step value $Step_3$ is 0.5 V. In this case, the second initialization sub-signal $VINT_{2-2}$ is adjusted for 0.5 V each time from high to low until the value $VINT_{2-2.k}$ of the adjusted second initialization sub-signal is less than-6 V.

In S4213, a plurality of flicker values of the display module 110 at the plurality of specified gray levels 1 to S for a target value AM Td of the light-emitting delay time and each second parameter group of the N×K second parameter groups are obtained.

In the above step, the target value AM Td of the light-emitting delay time may be any one of N target values AM Td of the light-emitting delay time corresponding to the N values of the first initialization sub-signal $VINT_{2-1}$ in the S410.

In addition, before each stepwise adjustment of the second initialization sub-signal $VINT_{2-2}$, for a value of the second initialization sub-signal $VINT_{2-2}$ obtained before the adjustment, a plurality of flicker values of the display module 110 at the plurality of specified gray levels 1 to S for the N values $VINT_{2-1.0}$ to $VINT_{2-1.n-1}$ of the first initialization sub-signal may be obtained.

That is, during the process of adjusting the second initialization sub-signal $VINT_{2-2}$ stepwise, the first initialization sub-signal $VINT_{2-1}$ is stepwise adjusted before each adjustment of the second initialization sub-signal $VINT_{2-2}$; and before each stepwise adjustment of the first initialization sub-signal $VINT_{2-1}$, a plurality of flicker values of the display module 110 at the plurality of specified gray levels 1 to S for a value of the first initialization sub-signal $VINT_{2-1}$ obtained before the adjustment are obtained simultaneously. Therefore, the plurality of values $VINT_{2-2}$ to $VINT_{2-2.k-1}$ of the second initialization sub-signal and the plurality of flicker values of the display module 110 at the plurality of specified gray levels 1 to S for each second parameter group of the N×K second parameter groups are obtained at the same time.

In S4214, one specified gray level is selected from the plurality of specified gray levels 1 to S as the target gray level.

In the above step, in flicker values at the target gray level for the N values $VINT_{2-1.0}$ to $VINT_{2-1.n-1}$ of the first initialization sub-signal and each of the values ($VINT_{2-2.0}$ to $VINT_{2-2.k-1}$) of the second initialization sub-signal $VINT_{2-2}$, a difference between the maximum flicker value and the minimum flicker value is in a first preset threshold range, and the first preset threshold range, for example, may be from 10 dB to 15 dB; and/or, a flicker value at the target gray level for each of the second parameter groups is in a second preset threshold range, and the second preset threshold range, for example, may be from −40 dB to −70 dB.

For example, as shown in FIG. 21, the target gray level is the specified gray level of 5.

In S4215, a value of the second initialization sub-signal $VINT_{2-2}$ is determined from the plurality of values $VINT_{2-2.0}$ to $VINT_{2-2.k-1}$ of the second initialization sub-signal as the preferred value of the second initialization sub-signal $VINT_{2-2}$, and a range of flicker values of the display module 110 at the target gray level for the value of the second initialization sub-signal $VINT_{2-2}$ is maximum.

In the above step, the value of the second initialization sub-signal $VINT_{2-2}$ is determined from the plurality of values $VINT_{2-2.0}$ to $VINT_{2-2.k-1}$ of the second initialization sub-signal, and the range of the flicker values of the display module 110 at the target gray level corresponding to the value of the second initialization sub-signal $VINT_{2-2}$ is maximum. That is, a difference between a maximum flicker value and a minimum flicker value of flicker values of the display module 110 at the target gray level for each of the values ($VINT_{2-2.0}$ to $VINT_{2-2.k-1}$) of the second initialization sub-signal $VINT_{2-2}$ is calculated, and a value of the second initialization sub-signal $VINT_{2-2}$ corresponding to a maximum difference is used as the preferred value PR $VINT_{2-2}$ of the second initialization sub-signal.

For example, as shown in FIG. 21, in a case where the target gray level is the specified gray level of 5, the preferred value PR $VINT_{2-2}$ of the second initialization sub-signal is ($VINT_{2-1.0}$+$Step_3$).

Figure 14:
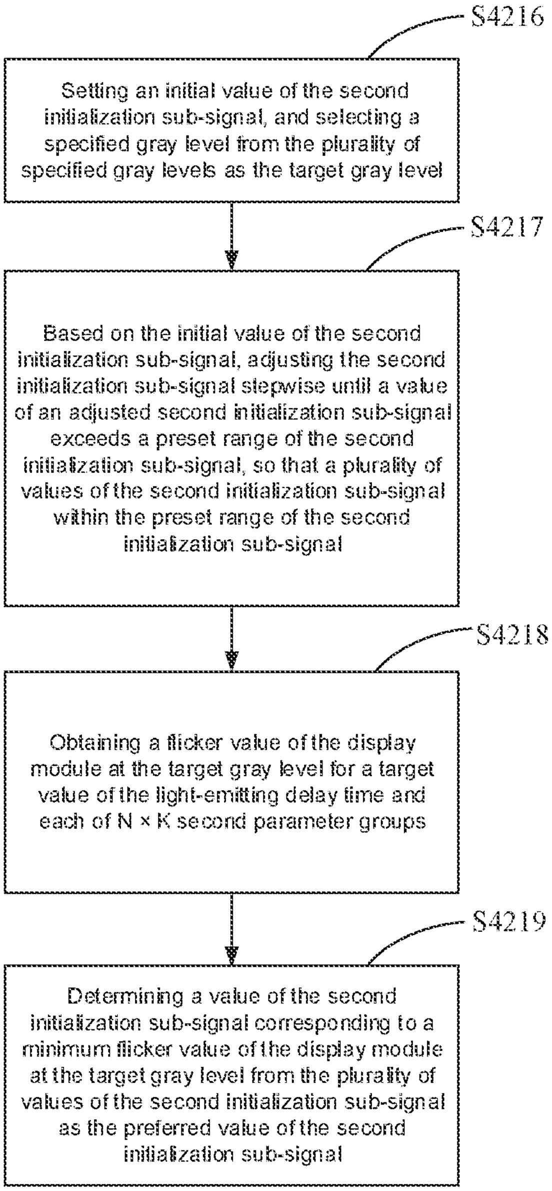

In some other embodiments, as shown in FIG. 14, S421 includes S4216 to S4219.

In S4216, an initial value $VINT_{2-2.0}$ of the second initialization sub-signal is set, and one specified gray level is selected from the plurality of specified gray levels 1 to S as a target gray level.

In the above steps, as for the meaning of the second initialization sub-signal $VINT_{2-2}$, a range of the initial value, and the meaning of the target gray level, reference may be made to the above description, and details will not be repeated here. Target gray levels corresponding to different line arrangements may be different. The target gray level may be selected according to actual line arrangements. That is, one specified gray level may be selected as the target gray level from the plurality of specified gray levels 1 to S according to experimental values.

In S4217, based on the initial value $VINT_{2-2.0}$ of the second initialization sub-signal, the second initialization sub-signal $VINT_{2-2}$ is adjusted stepwise until a value $VINT_{2-2.k}$ of an adjusted second sub-initialization signal exceeds a preset range of the second initialization sub-signal $VINT_{2-2}$, so that a plurality of values $VINT_{2-2.0}$ to $VINT_{2-2.k-1}$ of the second initialization sub-signal within the preset range of the second initialization sub-signal $VINT_{2-2}$ are obtained.

In the above step, the number of the plurality of values $VINT_{2-1.0}$ to $VINT_{2-1.n-1}$ of the first initialization sub-signal is N, and the number of the plurality of values $VINT_{2-2.0}$ to $VINT_{2-2.k-1}$ of the second initialization sub-signal is K. The N values $VINT_{2-1.0}$ to $VINT_{2-1.n-1}$ of the first initialization sub-signal and the K values $VINT_{2-2.0}$ to $VINT_{2-2.k-1}$ of the second initialization sub-signal are divided into N×K second parameter groups, and a second parameter group includes a single value of the first initialization sub-signal $VINT_{2-1}$ and a single value of the second initialization sub-signal $VINT_{2-2}$.

The preset range of the second initialization sub-signal $VINT_{2-2}$ may be referred to the above description. In addition, as for the process of adjusting the second initialization sub-signal $VINT_{2-2}$ stepwise until the value $VINT_{2-2.k}$ of the adjusted second sub-initialization signal exceeds the preset range of the second initialization sub-signal $VINT_{2-2}$, reference may be made to the above description, and details will not be repeated here.

In S4218, for a target value AM Td of the light-emitting delay time, a flicker value of the display module 110 at the target gray level for each second parameter group of the N×K second parameter groups is obtained.

In the above step, before each stepwise adjustment of the second initialization sub-signal $VINT_{2-2}$, for a value of the second initialization sub-signal $VINT_{2-2}$ obtained before each adjustment, flicker values of the display module 110 at the plurality of specified gray levels 1 to S for the N values $VINT_{2-1.0}$ to $VINT_{2-1.n-1}$ of the first initialization sub-signal are obtained.

That is, in the process of adjusting the second initialization sub-signal $VINT_{2-2}$ stepwise, the first initialization sub-signal $VINT_{2-1}$ is stepwise adjusted before each adjustment of the second initialization sub-signal $VINT_{2-2}$; and before each stepwise adjustment of the first initialization sub-signal $VINT_{2-1}$, a plurality of flicker values of the display module 110 at a plurality of specified gray levels 1 to S for a value of the first sub-initialization signal $VINT_{2-1}$ obtained before the adjustment are obtained simultaneously.

Therefore, when the plurality of values $VINT_{2-2}$ to $VINT_{2-2.k-1}$ of the second initialization sub-signal are obtained, a plurality of flicker values of the display module 110 at the plurality of specified gray levels 1 to S for each of the N×K second parameter groups are obtained at the same time.

In S4219, a value of the second initialization sub-signal $VINT_{2-2}$ is determined from the plurality of values $VINT_{2-2.0}$ to $VINT_{2-2.k-1}$ of the second initialization sub-signal as a preferred value of the second initialization sub-signal $VINT_{2-2}$, and the value of the second initialization sub-signal $VINT_{2-2}$ corresponds to a minimum flicker value of the display module 110 at the target gray level.

Figure 22:
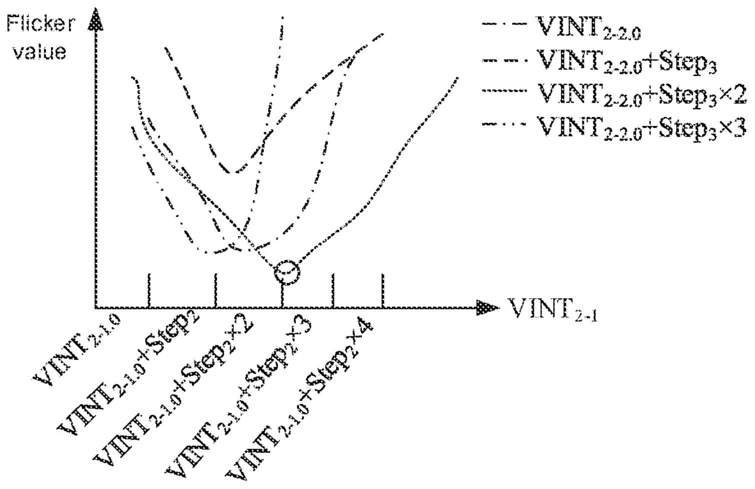
FIG. 22 is a data diagram of flicker values of a display module for a plurality of values of a first initialization sub-signal and a plurality of values of a second initialization sub-signal, in accordance with some embodiments.

In the above step, as shown in FIG. 22, in a case where the target gray level is the specified gray level of 5, the preferred value PR $VINT_{2-2}$ of the second initialization sub-signal is a value of the second initialization sub-signal $VINT_{2-2}$ corresponding to a lowest point in the circle in FIG. 22, i.e., $VINT_{2-2.0}+Step_3\times2$.

Figure 15:
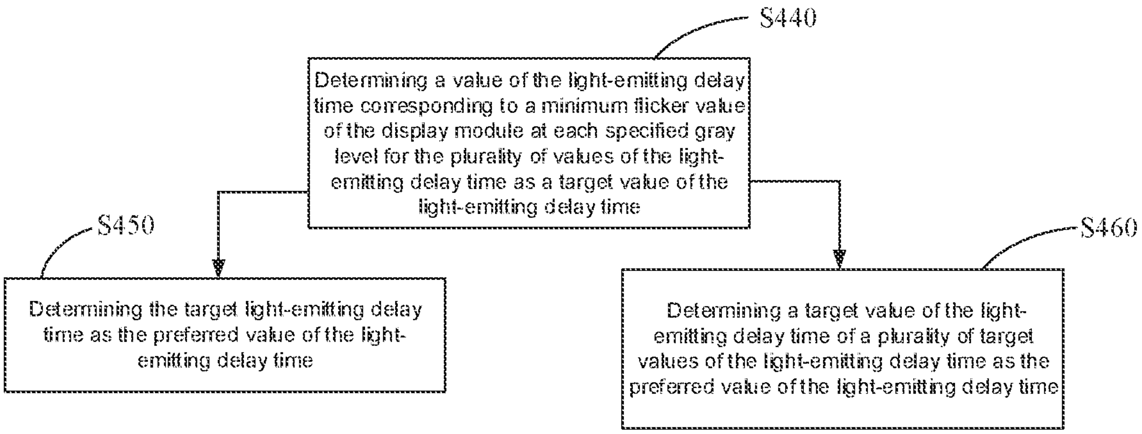

In some other embodiments, as shown in FIG. 15, S400 includes S440 to S460.

In S440, a value of the light-emitting delay time Td corresponding to a minimum flicker value of the display module 110 at each of the specified gray levels (1 to S) for the plurality of values $Td_0$ to $Td_{m-1}$ of the light-emitting delay time is determined as a target value AM Td of the light-emitting delay time.

Figure 20:
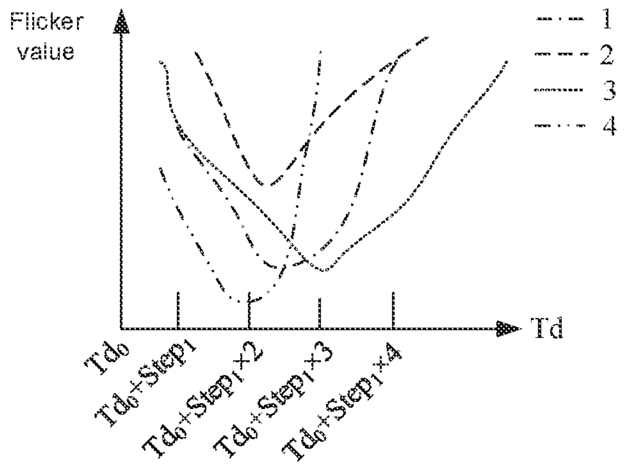
FIG. 20 is a data diagram of a flicker of a display module at a plurality of light-emitting delay times and a plurality of specified gray levels, in accordance with some embodiments.

In the above step, as shown in FIG. 20, the target value AM Td of the light-emitting delay time corresponding to the specified gray level of 1 is ($Td_0+Step_1\times2$); the target value AM Td of the light-emitting delay time corresponding to the specified gray level of 2 is ($Td_0+Step_1\times2$); the target value AM Td of the light-emitting delay time corresponding to the specified gray level of 3 is ($Td_0+Step_1\times3$); and the target value AM Td of the light-emitting delay time corresponding to the specified gray level of 4 is ($Td_0+Step_1\times2$).

In a case where there is one target value AM Td of the light-emitting delay time, S450 is performed; in a case where there are a plurality of target values AM Td of the light-emitting delay time, S460 is performed.

In S450, the target value AM Td of the light-emitting delay time is determined as the preferred value PR Td of the light-emitting delay time.

In the above step, all minimum flicker values of the specified gray levels 1 to S correspond to a same value of the light-emitting delay time Td, and the value of the light-emitting delay time Td is the target value AM Td of the light-emitting delay time, i.e., the preferred value PR Td of the light-emitting delay time.

In S460, one target value AM Td of the light-emitting delay time of the plurality of target values AM Td of the light-emitting delay time is determined as the preferred value PR Td of the light-emitting delay time.

In the above step, the number of minimum flicker values corresponding to the preferred value PR Td of the light-emitting delay time is greater than or equal to the number of minimum flicker values corresponding to each of remaining target values AM Td of the light-emitting delay time. As shown in FIG. 20, the preferred value PR Td of the light-emitting delay time is ($Td_0+Step_1\times2$).

Figure 16:
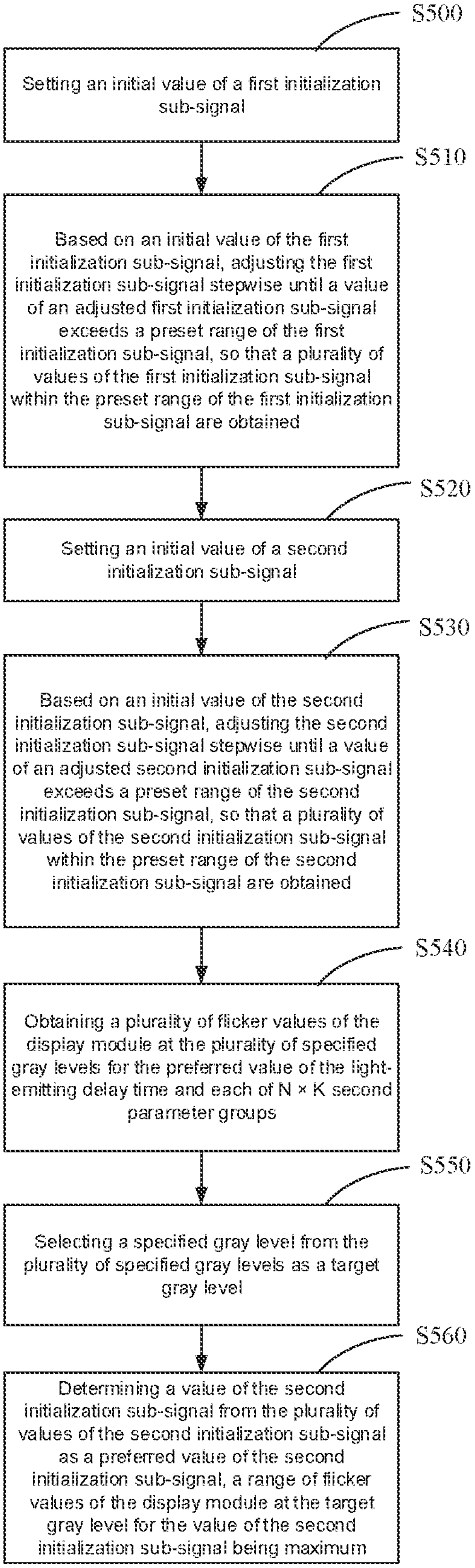

Based on this, as shown in FIG. 16, in some embodiments, the parameter adjustment method further includes S500 to S560.

In S500, an initial value $VINT_{2-1.0}$ of the first initialization sub-signal is set.

In the above step, as for the meaning of the first initialization sub-signal $VINT_{2-1}$ and the range of the initial value, reference may be made to the above description, and details will not be repeated here.

In S510, based on the initial value $VINT_{2-1.0}$ of the first initialization sub-signal, the first initialization sub-signal $VINT_{2-1}$ is adjusted stepwise until a value $VINT_{2-1.n}$ of an adjusted first initialization sub-signal exceeds a preset range of the first initialization sub-signal $VINT_{2-1}$, so that a plurality of values $VINT_{2-1.0}$ to $VINT_{2-1.n-1}$ of the first initialization sub-signal within the preset range of the first sub-initialization signal $VINT_{2-1}$ are obtained.

In the above step, the number of the values $VINT_{2-1.0}$ to $VINT_{2-1.n-1}$ of the first initialization sub-signal is N. The preset range of the first initialization sub-signal $VINT_{2-1}$ may be referred to the above description, and details will not be repeated here. In addition, as for the process of adjusting the first sub-initialization signal $VINT_{2-1}$ stepwise until the value $VINT_{2-1.n}$ of the first sub-initialization signal after the adjustment exceeds the preset range of the first sub-initialization signal $VINT_{2-1}$, reference may be made to the S320 in the above description, and details will not be repeated here.

In S520, an initial value $VINT_{2-2.0}$ of the second initialization sub-signal is set.

In the above step, as for the meaning of the second initialization sub-signal $VINT_{2-2}$ and the range of the initial value, reference may be made to the above description, and details will not be repeated herein.

In S530, based on the initial value $VINT_{2-2.0}$ of the second initialization sub-signal, the second initialization sub-signal $VINT_{2-2}$ is adjusted stepwise until a value $VINT_{2-2.k}$ of an adjusted second initialization sub-signal exceeds a preset range of the second initialization sub-signal $VINT_{2-2}$, so that a plurality of values $VINT_{2-2.0}$ to $VINT_{2-2.k-1}$ of the second initialization sub-signal within the preset range of the second initialization sub-signal $VINT_{2-2}$ are obtained.

In the above step, the number of the plurality of values $VINT_{2-1.0}$ to $VINT_{2-1.n-1}$ of the first initialization sub-signal is N, the number of the plurality of values $VINT_{2-2.0}$ to $VINT_{2-2.k-1}$ of the second initialization sub-signal is K; the N values $VINT_{2-1.0}$ to $VINT_{2-1.n-1}$ of the first initialization sub-signal and the K values $VINT_{2-2.0}$ to $VINT_{2-2.k-1}$ of the second initialization sub-signal are divided into N×K second parameter groups, and a second parameter group includes a single value of the first initialization sub-signal $VINT_{2-1}$ and a single value of the second initialization sub-signal $VINT_{2-2}$.

As for the preset range of the second initialization sub-signal $VINT_{2-2}$, reference may be made to the above description. In addition, as for the process of adjusting the second initialization sub-signal $VINT_{2-2}$ stepwise until the value $VINT_{2-2.k}$ of the adjusted second initialization sub-signal exceeds the preset range of the second initialization sub-signal $VINT_{2-2}$, reference may be made to the above description, and details will not be repeated here.

In S540, for the preferred value PR Td of the light-emitting delay time and each of the N×K second parameter groups, a plurality of flicker values of the display module 110 at the plurality of specified gray levels 1 to S are obtained.

In the above step, before each stepwise adjustment of the second initialization sub-signal $VINT_{2-2}$, for a value of the second initialization sub-signal $VINT_{2-2}$ obtained before the adjustment, flicker values of the display module 110 at the plurality of specified gray levels 1 to S for the N values $VINT_{2\text{-}1.0}$ to $VINT_{2\text{-}1.n\text{-}1}$ of the first initialization sub-signal are obtained.

That is, during the process of adjusting the second initialization sub-signal $VINT_{2\text{-}2}$ stepwise, before each adjustment of the second initialization sub-signal $VINT_{2\text{-}2}$, the first initialization sub-signal $VINT_{2\text{-}1}$ is stepwise adjusted; and before each stepwise adjustment of the first initialization sub-signal $VINT_{2\text{-}1}$, for a value of the first initialization sub-signal $VINT_{2\text{-}1}$ obtained before the adjustment, flicker values of the display module 110 at the plurality of specified gray levels 1 to S are obtained simultaneously. Therefore, when the plurality of values $VINT_{2\text{-}2}$ to $VINT_{2\text{-}2.k\text{-}1}$ of the second initialization sub-signal is obtained, a plurality of flicker values of the display module 110 at the plurality of specified gray levels 1 to S for each of the N×K second parameter groups are obtained at the same time.

In S550, a specified gray level is selected from the plurality of specified gray levels 1 to S as a target gray level.

In the above step, in flicker values at the target gray level for the N values $VINT_{2\text{-}1.0}$ to $VINT_{2\text{-}1.n\text{-}1}$ of the first initialization sub-signal corresponding to each of the values ($VINT_{2\text{-}2.0}$ to $VINT_{2\text{-}2.k\text{-}1}$) of the second initialization sub-signal $VINT_{2\text{-}2}$, a difference between the maximum flicker value and a minimum flicker value is within a first preset threshold range, and the first preset threshold range, for example, may be 10 dB to 15 dB; and/or, a flicker value at the target gray level for each of the second parameter groups are within a second preset threshold range, and the second preset threshold range, for example, may be −40 dB to −70 dB.

For example, as shown in FIG. 21, the target gray level is a specified gray level of 5.

In S560, a value of the second initialization sub-signal $VINT_{2\text{-}2}$ is determined from the plurality of values $VINT_{2\text{-}2.0}$ to $VINT_{2\text{-}2.k\text{-}1}$ of the second initialization sub-signal as a preferred value PR $VINT_{2\text{-}2}$ of the second initialization sub-signal, and a range of flicker values of the display module 110 at the target gray level for the value of the second initialization sub-signal $VINT_{2\text{-}2}$ is maximum.

In the above step, the value of the second initialization sub-signal $VINT_{2\text{-}2}$ is determined from the plurality of values $VINT_{2\text{-}2.0}$ to $VINT_{2\text{-}2.k\text{-}1}$ of the second initialization sub-signal, and the range of flicker values of the display module 110 at the target gray level for the value of the second initialization sub-signal $VINT_{2\text{-}2}$ is maximum. That is, in flicker values of the display module 110 at the target gray level for each of the values ($VINT_{2\text{-}2.0}$ to $VINT_{2\text{-}2.k\text{-}1}$) of the second initialization sub-signal $VINT_{2\text{-}2}$, a difference between a maximum flicker value and a minimum flicker value is calculated, and then a value of the second initialization sub-signal $VINT_{2\text{-}2}$ corresponding to a maximum difference is used as the preferred value PR $VINT_{2\text{-}2}$ of the second initialization sub-signal.

For example, as shown in FIG. 21, in a case where the target gray level is the specified gray level of 5, the preferred value PR $VINT_{2\text{-}2}$ of the second initialization sub-signal is ($VINT_{2\text{-}1.0}$+$Step_3$).

Figure 17:
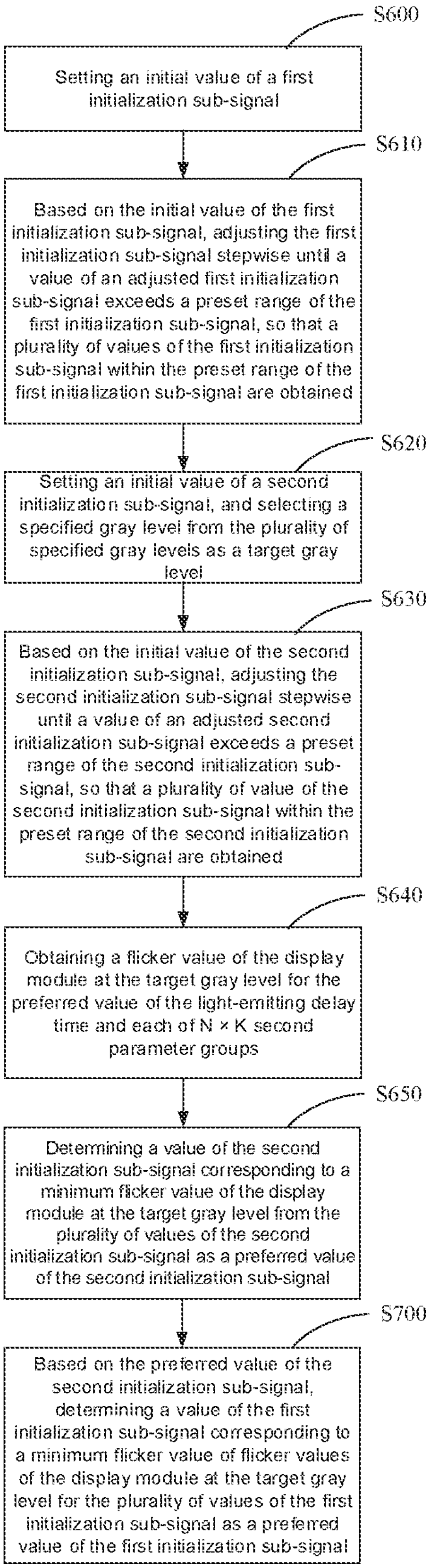

In some other embodiments, as shown in FIG. 17, the parameter adjustment method further includes S600 to S650.

In S600, an initial value $VINT_{2\text{-}1.0}$ of the first initialization sub-signal is set.

In the above step, as for the meaning of the first initialization sub-signal $VINT_{2\text{-}1}$ and a range of the initial value, reference may be made to the above description, and details will not be repeated here.

In S610, based on the initial value $VINT_{2\text{-}1.0}$ of the first initialization sub-signal, the first initialization sub-signal $VINT_{2\text{-}1}$ is adjusted stepwise until a value $VINT_{2\text{-}1.n}$ of the adjusted first initialization sub-signal exceeds a preset range of the first initialization sub-signal $VINT_{2\text{-}1}$, so that a plurality of values $VINT_{2\text{-}1.0}$ to $VINT_{2\text{-}1.n\text{-}1}$ of the first initialization sub-signal within the preset range of the first initialization sub-signal $VINT_{2\text{-}1}$ are obtained.

In the above step, the number of the values $VINT_{2\text{-}1.0}$ to $VINT_{2\text{-}1.n\text{-}1}$ of the first initialization sub-signal is N. As for the preset range of the first initialization sub-signal $VINT_{2\text{-}1}$, reference may be made to the above description. In addition, as for the process of adjusting the first initialization sub-signal $VINT_{2\text{-}1}$ stepwise until the value $VINT_{2\text{-}1.n}$ of the adjusted second initialization sub-signal exceeds the preset range of the first initialization sub-signal $VINT_{2\text{-}1}$, reference may be made to the above description, and details will not be repeated here.

In S620, an initial value $VINT_{2\text{-}2.0}$ of the second initialization sub-signal is set, and a specified gray level from the plurality of specified gray levels 1 to S is selected as a target gray level.

In the above step, as for the meaning of the second initialization sub-signal $VINT_{2\text{-}2}$, a range of the initial value and the meaning of the target gray level, reference may be made to the above description, and details will not be repeated here. Target gray levels corresponding to different line arrangements may be different. The target gray level may be selected according to actual line arrangements. That is, a single specified gray level may be selected as the target gray level from the plurality of specified gray levels 1 to S according to empirical values.

In S630, based on the initial value $VINT_{2\text{-}2.0}$ of the second initialization sub-signal, the second initialization sub-signal $VINT_{2\text{-}2}$ is adjusted stepwise until a value $VINT_{2\text{-}2.k}$ of the adjusted second initialization sub-signal exceeds a preset range of the second initialization sub-signal, so that a plurality of values $VINT_{2\text{-}2.0}$ to $VINT_{2\text{-}2.k\text{-}1}$ of the second initialization sub-signal within the preset range of the second initialization sub-signal $VINT_{2\text{-}2}$ are obtained.

In the above step, the number of the plurality of values $VINT_{2\text{-}2.0}$ to $VINT_{2\text{-}2.k\text{-}1}$ of the second initialization sub-signal is K; the N values $VINT_{2\text{-}1.0}$ to $VINT_{2\text{-}1.n\text{-}1}$ of the first initialization sub-signal and the K values $VINT_{2\text{-}2.0}$ to $VINT_{2\text{-}2.k\text{-}1}$ of the second initialization sub-signal are divided into N×K second parameter groups, and a second parameter group includes a single value of the first initialization sub-signal $VINT_{2\text{-}1}$ and a single value of the second initialization sub-signal $VINT_{2\text{-}2}$.

As for the preset range of the second initialization sub-signal $VINT_{2\text{-}2}$, reference may be made to the above description. In addition, as for the process of adjusting the second initialization sub-signal $VINT_{2\text{-}2}$ stepwise until the value $VINT_{2\text{-}2.k}$ of the adjusted second initialization sub-signal exceeds the preset range of the second initialization sub-signal $VINT_{2\text{-}2}$, reference may be made to the above description, and details will not be repeated here.

In S640, a flicker value of the display module 110 at the target gray level is obtained for the preferred value PR Td of the light-emitting delay time and each of the N×K second parameter groups.

In the above step, before each stepwise adjustment of the second initialization sub-signal $VINT_{2\text{-}2}$, for a value of the second initialization sub-signal $VINT_{2\text{-}2}$ obtained before the adjustment, flicker values of the display module 110 at the target gray level for the N values $VINT_{2\text{-}1.0}$ to $VINT_{2\text{-}1.n\text{-}1}$ of the first initialization sub-signal are obtained.

That is, during the stepwise adjustment of the second initialization sub-signal $VINT_{2-2}$, before each adjustment of the second initialization sub-signal $VINT_{2-2}$, the first initialization sub-signal $VINT_{2-1}$ is stepwise adjusted; and before each stepwise adjustment of the first initialization sub-signal $VINT_{2-1}$, for a value of the first initialization sub-signal $VINT_{2-1}$ obtained before the adjustment, flicker values of the display module 110 at the plurality of specified gray levels 1 to S are obtained simultaneously. Therefore, when the plurality of values $VINT_{2-2}$ to $VINT_{2-2.k-1}$ of the second initialization sub-signal are obtained, a plurality of flicker values of the display module 110 at the plurality of specified gray levels 1 to S for each of the N×K second parameter groups are obtained at the same time.

In S650, a value of the second initialization sub-signal $VINT_{2-2}$ is determined from the plurality of values $VINT_{2-2.0}$ to $VINT_{2-2.k-1}$ of the second initialization sub-signal as a preferred value PR $VINT_{2-2}$ of the second initialization sub-signal, and the value of the second initialization sub-signal $VINT_{2-2}$ corresponds to a minimum flicker value of the display module 110 at the target gray level.

In the above step, as shown in FIG. 22, in a case where the target gray level is the specified gray level of 5, the preferred value PR $VINT_{2-2}$ of the second initialization sub-signal is a value of the second initialization sub-signal $VINT_{2-2}$ corresponding to the lowest point in the circle in FIG. 22, i.e., $VINT_{2-2.0}+Step_3\times2$.

Based on these, as shown in FIG. 17, the parameter adjustment method further includes S700.

In S700, based on the preferred value PR $VINT_{2-2}$ of the second initialization sub-signal, a value of the first initialization sub-signal $VINT_{2-1}$ corresponding to a minimum flicker value of flicker values of the display module 110 at the target gray level for the plurality of values $VINT_{2-1.0}$ to $VINT_{2-1.n-1}$ of the first initialization sub-signal is determined as a preferred value PR $VINT_{2-1}$ of the first initialization sub-signal.

In the above step, as shown in FIG. 22, in a case where the target gray level is the specified gray level of 5, and the preferred value PR $VINT_{2-2}$ of the second initialization sub-signal is $VINT_{2-2.0}+Step_3\times2$, the preferred value PR $VINT_{2-1}$ of the first initialization sub-signal is $VINT_{2-1.0}+Step_2\times3$.

Figure 18:
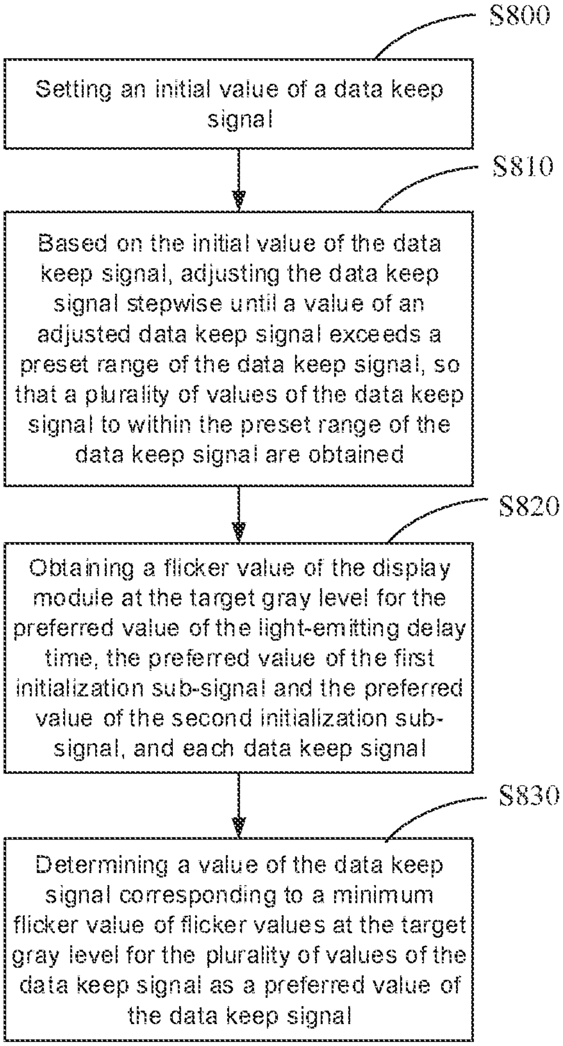

In some embodiments, as shown in FIG. 18, the parameter adjustment method further includes S800 to S830.

In S800, an initial value $V_{keep.0}$ of the data keep signal is set.

In the above step, the data keep signal $V_{keep}$ is the data signal received by the data signal terminal of the pixel driving circuit 12 in the keep frame. The initial value $V_{keep.0}$ of the data keep signal may be in a range from 1 V to 8 V. For example, the initial value $V_{keep.0}$ of the data keep signal may be any one of 1 V. 3 V, 5 V, and 8 V.

In S810, based on the initial value $V_{keep.0}$ of the data keep signal, the data keep signal $V_{keep}$ is adjusted stepwise until a value $V_{keep.x}$ of an adjusted data keep signal exceeds a preset range of the data keep signal $V_{keep}$, so that a plurality of values $V_{keep.0}$ to $V_{keep.x}$ of the data keep signal within the preset range of the data keep signal $V_{keep}$ are obtained.

In the above step, x is greater than or equal to 1 (x≥1), and x is a positive integer. The preset range of the data keep signal $V_{keep}$ is from 1 V to 8 V. Adjusting the data keep signal $V_{keep}$ stepwise may be that, based on the initial value $V_{keep.0}$ of the data keep signal, the data keep signal $V_{keep}$ is adjusted from low to high or high to low according to a fourth set step value $Step_4$, and a value $V_{keep.x}$ of the data keep signal is obtained after each adjustment. The fourth set step value $Step_4$ may be in a range from 0.1 V to 0.5 V. For example, the fourth set step value $Step_4$ may be any one of 0.1 V. 0.2 V. 0.3 V, 0.4 V, and 0.5 V.

For example, the initial value $V_{keep.0}$ of the data keep signal is 1 V, and the fourth set step value $Step_4$ is 0.1 V. In this case, the data keep signal $V_{keep}$ is adjusted from low to high for 0.1 V each time until the value $V_{keep.x}$ of the adjusted data keep signal is greater than 8 V.

For example, the initial value $V_{keep.0}$ of the data keep signal is 8 V, and the fourth set step value $Step_4$ is 0.5 V. In this case, the data keep signal $V_{keep}$ is adjusted from high to low for 0.5 V each time until the value $V_{keep.x}$ of the adjusted data keep signal is less than 1 V.

In S820, for the preferred value PR Td of the light-emitting delay time, the preferred value PR $VINT_{2-1}$ of the first initialization sub-signal, the preferred value PR $VINT_{2-2}$ of the second initialization sub-signal, and each of the values ($V_{keep.0}$ to $V_{keep.x}$) of the data keep signal $V_{keep}$, a flicker value of the display module 110 at the target gray level is obtained.

In the above step, before each stepwise adjustment of the data keep signal $V_{keep}$, a flicker value of the display module 110 at the target gray level for a value of the data keep signal $V_{keep}$ obtained before the adjustment is obtained. That is, during the process of adjusting the data keep signal $V_{keep}$ stepwise, the flicker value at the target gray level for the value of the data keep signal $V_{keep}$ obtained before each adjustment is obtained. Therefore, when the plurality of values $V_{keep}$ to $V_{keep.x}$ of the data keep signal are obtained, a flicker value of the display module 110 at the target gray level for each of the values ($V_{keep}$ to $V_{keep.0}$) of the data keep signal $V_{keep}$ is obtained.

In S830, a data keep signal corresponding to a minimum flicker value of flicker values at the target gray level for the plurality of values ($V_{keep}$ to $V_{keep.x}$) of the data keep signal is determined as a preferred value PR $V_{keep}$ of the data keep signal.

Figure 23:
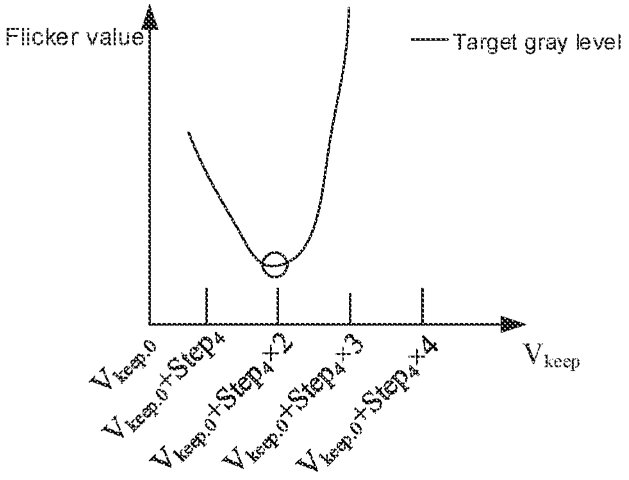
FIG. 23 is a data diagram of flicker values of a display module at a target gray level for a plurality of values of a data keep signal, in accordance with some embodiments.

In the above step, as shown in FIG. 23, the preferred value PR $V_{keep}$ of the data keep signal is a value of the data keep signal $V_{keep}$ corresponding to the lowest point in the circle in FIG. 23, i.e., $V_{keep.0}+Step_4\times2$.

Some embodiments of the present disclosure provide an electronic device. The electronic device includes a processor and a memory storing computer program instructions. The computer program instructions, when executed on the processor, cause the processor to perform one or more steps of the parameter adjustment method as described in any one of the above embodiments.

As shown in FIG. 8, some embodiments of the present disclosure provide a parameter adjustment system 120 of the display module 110, and the parameter adjustment system 120 includes a processor 40, a testing device 50, and a detection device 60.

The processor 40 is configured to perform one or more steps of the parameter adjustment method as described in any one of the above embodiments. For example, the processor 40 may be a processor 40 on a motherboard of the display device 100 (shown in FIG. 1). The testing device 50 is coupled to the processor 40. The testing device 50 is configured to output a control instruction for controlling the display of the display module 110 according to the light-emitting delay time Td, the first initialization sub-signal $VINT_{2-1}$, the second initialization sub-signal $VINT_{2-2}$, and the data keep signal $V_{keep}$ that are from the processor 40. For example, the testing device 50 is an image generator. The detection device 60 is coupled to the processor 40. The detection device 60 is configured to detect a flicker value of the display module 110 when the display module 110 displays an image, and send the flicker value to the processor 40. For example, the detection device 60 is a color analyzer.

Some embodiments of the present disclosure provide a computer-readable storage medium (e.g., a non-transitory computer-readable storage medium). The computer-readable storage medium stores computer program instructions that, when executed on a computer (e.g., a display device), cause the computer to perform the parameter adjustment method as described in any one of the above embodiments.

For example, the computer-readable storage medium may include, but is not limited to, a magnetic storage device (e.g., a hard disk, a floppy disk, or a magnetic tape), an optical disk (e.g., a compact disk (CD) or a digital versatile disk (DVD)), a smart card, a flash memory device (e.g., an erasable programmable read-only memory (EPROM), a card, a stick or a key driver). Various computer-readable storage medium described in the present disclosure may represent one or more devices and/or other machine-readable storage media for storing information. The term "machine-readable storage medium" may include, but is not limited to, wireless channels and various other media capable of storing, containing and/or carrying instructions and/or data.

Some embodiments of the present disclosure provide a computer program product stored on a non-transitory computer-readable storage medium. The computer program product includes computer program instructions that, when executed on a computer (e.g., a display device), cause the computer to perform the parameter adjustment method as described in any one of the above embodiments.

Some embodiments of the present disclosure further provide a computer program. When executed on a computer (e.g., a display device), the computer program causes the computer to perform the parameter adjustment method as described in any one of the above embodiments.

Beneficial effects of the computer-readable storage medium, the computer program product, and the computer program are the same as beneficial effects of the parameter adjustment method in the embodiments described above, and details will not be repeated here.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A parameter adjustment method of a display module, wherein the display module is capable of operating in a low frequency driving mode, the low frequency driving mode includes a plurality of low frequency cycles, and a low frequency cycle includes a refresh frame and at least one keep frame;

the parameter adjustment method comprising:

setting an initial value of a light-emitting delay time and a plurality of specified gray levels, wherein the light-emitting delay time is a time interval between a start of a charging period of a frame of the refresh frame and the at least one keep frame and a start of a light-emitting period of the frame;

based on the initial value of the light-emitting delay time, adjusting the light-emitting delay time stepwise until a value of an adjusted light-emitting delay time exceeds a preset range of the light-emitting delay time, so that a plurality of values of the light-emitting delay time within the preset range of the light-emitting delay time are obtained;

obtaining a plurality of flicker values of the display module at the plurality of specified gray levels for each value of the light-emitting delay time; and determining a preferred value of the light-emitting delay time from the plurality of values of the light-emitting delay time according to a plurality of flicker values corresponding to the plurality of values of the light-emitting delay time.

2. The parameter adjustment method according to claim 1, wherein obtaining the flicker values of the display module at the plurality of specified gray levels for each value of the light-emitting delay time, includes:

setting an initial value of a first initialization sub-signal, wherein the first initialization sub-signal is an initialization signal received by a light-emitting device included in the display module during the refresh frame;

based on the initial value of the first initialization sub-signal, adjusting the first initialization sub-signal stepwise until a value of an adjusted first initialization sub-signal exceeds a preset range of the first initialization sub-signal, so that a plurality of values of the first initialization sub-signal within the preset range of the first initialization sub-signal are obtained, wherein a number of the plurality of values of the light-emitting delay time is M, a number of the plurality of values of the first initialization sub-signal is N, the M values of the light-emitting delay time and the N values of the first initialization sub-signal are divided into M×N first parameter groups, and a first parameter group includes a single value of the light-emitting delay time and a single value of the first initialization sub-signal; and obtaining the plurality of flicker values of the display module at the plurality of specified gray levels for each first parameter group of the M×N first parameter groups.

3. The parameter adjustment method according to claim 2, wherein flicker values corresponding to a single first parameter group constitute a single set of flicker values;

determining the preferred value of the light-emitting delay time from the plurality of values of the light-emitting delay time according to the plurality of flicker values corresponding to the plurality of values of the light-emitting delay time, includes:

determining a target value of the light-emitting delay time corresponding to each value of the first initialization sub-signal from the M values of the light-emitting delay time, so as to obtain a plurality of target values of the light-emitting delay time, wherein the target value of the light-emitting delay time is a value of the light-emitting delay time corresponding to a set of flicker values with a highest convergence in M sets of flicker values, and the M sets of flicker values corresponds to the M values of the light-emitting delay time and each include the value of the first initialization sub-signal;

determining a preferred value of the first initialization sub-signal, wherein the preferred value of the first initialization sub-signal is one of the N values of the first initialization sub-signal; and determining a target value of the light-emitting delay time corresponding to the preferred value of the first initialization sub-signal as a preferred value of the light-emitting delay time.

4. The parameter adjustment method according to claim 3, wherein determining the preferred value of the first initialization sub-signal from the N values of the first initialization sub-signal, includes:

obtaining a plurality of values of a second initialization sub-signal;

determining one value of the plurality of values of the second initialization sub-signal as a preferred value of the second initialization sub-signal, wherein the second initialization sub-signal is an initialization signal received by the light-emitting device during a keep frame;

for the preferred value of the second initialization sub-signal, obtaining N flicker values at a target gray level corresponding to the N values of the first initialization sub-signal, wherein the target gray level is one of the plurality of specified gray levels; and determining a value of the first initialization sub-signal corresponding to a minimum flicker value of the N flicker values as the preferred value of the first initialization sub-signal.

5. The parameter adjustment method according to claim 4, wherein obtaining the plurality of values of the second initialization sub-signal includes:

setting an initial value of the second initialization sub-signal; and based on the initial value of the second initialization sub-signal, adjusting the second initialization sub-signal stepwise until a value of an adjusted second initialization sub-signal exceeds a preset range of the second initialization sub-signal, so that the plurality of values of the second initialization sub-signal within the preset range of the second initialization sub-signal are obtained, wherein the number of the plurality of values of the first initialization sub-signal is N, a number of the plurality of values of the second initialization sub-signal is K, the N values of the first initialization sub-signal and the K values of the second initialization sub-signal are divided into N×K second parameter groups, and a second parameter group includes one value of the first initialization sub-signal and one value of the second initialization sub-signal;

determining the one value of the plurality of values of the second initialization sub-signal as the preferred value of the second initialization sub-signal, includes:

obtaining a plurality of flicker values of the display module at the plurality of specified gray levels for a target value of the plurality of target values of the light-emitting delay time and each second parameter group of the N×K second parameter groups;

selecting a specified gray level from the plurality of specified gray levels as the target gray level, wherein in flicker values at the target gray level for the N values of the first initialization sub-signal and each value of the second initialization sub-signal, a difference between a maximum flicker value and a minimum flicker value is within a first preset threshold range; and/or, a flicker value at the target gray level for each of the second parameter groups are within a second preset threshold range; and determining a value of the second initialization sub-signal from the plurality of values of the second initialization sub-signal as the preferred value of the second initialization sub-signal, wherein a range of flicker values of the display module at the target gray level for the value of the second initialization sub-signal is maximum.

6. The parameter adjustment method according to claim 4, wherein obtaining the plurality values of the second initialization sub-signal, includes:

setting an initial value of the second initialization sub-signal;

selecting a specified gray level from the plurality of specified gray levels as the target gray level; and based on the initial value of the second initialization sub-signal, adjusting the second initialization sub-signal stepwise until a value of an adjusted second initialization sub-signal exceeds a preset range of the second initialization sub-signal, so that a plurality of values of the second initialization sub-signal within the preset range of the second initialization sub-signal are obtained, wherein the number of the plurality of values of the first initialization sub-signal is N, a number of the plurality of values of the second initialization sub-signal is K, the N values of the first initialization sub-signal and the K values of the second initialization sub-signal are divided into N×K second parameter groups, and a second parameter group includes one value of the first initialization sub-signal and one value of the second initialization sub-signal;

determining the one value of the plurality of values of the second initialization sub-signal as the preferred value of the second initialization sub-signal, includes:

obtaining a flicker value of the display module at the target gray level for a target value of the plurality of target values light-emitting delay time and each second parameter group of the N×K second parameter groups; and determining a value of the second initialization sub-signal, corresponding to a minimum flicker value of the display module at the target gray level, from the plurality of values of the second initialization sub-signal as the preferred value of the second initialization sub-signal.

7. The parameter adjustment method according to claim 1, wherein determining the preferred value of the light-emitting delay time from the plurality of values of the light-emitting delay time according to the plurality of flicker values corresponding to the plurality of values of the light-emitting delay time, includes:

determining a value of the light-emitting delay time corresponding to a minimum flicker value of the display module at each specified gray level for the plurality of values of the light-emitting delay time as a target value of the light-emitting delay time;

in a case where the plurality of specified gray levels correspond to one target value of the light-emitting delay time, determining the one target value of the light-emitting delay time as the preferred value of the light-emitting delay time;

in a case where the plurality of specified gray levels correspond to a plurality of target values of the light-emitting delay time, determining one of the plurality of target values of the light-emitting delay time as the preferred value of the light-emitting delay time, wherein a number of minimum flicker values corresponding to the preferred light-emitting delay time is greater than or equal to a number of minimum flicker values corresponding to each of remaining target values of the light-emitting delay time.

8. The parameter adjustment method according to claim 7, further comprising:

setting an initial value of a first initialization sub-signal, wherein the first initialization sub-signal is an initialization signal received by a light-emitting device included in the display module during the refresh frame;

based on the initial value of the first initialization sub-signal, adjusting the first initialization sub-signal stepwise until a value of an adjusted first initialization sub-signal exceeds a preset range of the first initialization sub-signal, so that a plurality of values of the first initialization sub-signal within the preset range of the first initialization sub-signal are obtained, wherein a number of the plurality of values of the first initialization sub-signal is N;

setting an initial value of a second initialization sub-signal, wherein the second initialization sub-signal is an initialization signal received by the light-emitting device during a keep frame;

based on the initial value of the second initialization sub-signal, adjusting the second initialization sub-signal stepwise until a value of an adjusted second initialization sub-signal exceeds a preset range of the second initialization sub-signal, so that a plurality of values of the second initialization sub-signal within the preset range of the second initialization sub-signal are obtained, wherein a number of the plurality of values of the second initialization sub-signal is K, the N values of the first initialization sub-signal and the K values of the second initialization sub-signal are divided into N×K second parameter groups, and a second parameter group includes a single value of the first initialization sub-signal and a single value of the second initialization sub-signal;

obtaining a plurality of flicker values of the display module at the plurality of specified gray levels for the preferred value of the light-emitting delay time and each second parameter group of the N×K second parameter groups;

selecting a specified gray level from the plurality of specified gray levels as a target gray level, wherein in flicker values at the target gray level for the N values of the first initialization sub-signal and each value of second initialization sub-signal, a difference between a maximum flicker value and a minimum flicker value is within a first preset threshold range; and/or, a flicker value at the target gray level for each of the second parameter groups are within a second preset threshold range; and determining a value of the second initialization sub-signal from the plurality of values of the second initialization sub-signal as a preferred value of the second initialization sub-signal, wherein a range of flicker values of the display module at the target gray level for the value of the second initialization sub-signal is maximum.

9. The parameter adjustment method according to claim 5 or 8, wherein the first preset threshold range is from 10 dB to 15 dB; and/or, the second preset threshold range is from −40 dB to −70 dB.

10. The parameter adjustment method according to claim 7, further comprising:

setting an initial value of a first initialization sub-signal, wherein the first initialization sub-signal is an initialization signal received by a light-emitting device during the refresh frame;

based on the initial value of the first initialization sub-signal, adjusting the first initialization sub-signal stepwise until a value of an adjusted first initialization sub-signal exceeds a preset range of the first initialization sub-signal, so that a plurality of values of the first initialization sub-signal within the preset range of the first initialization sub-signal are obtained, wherein a number of the plurality of values of the first initialization sub-signal is N;

setting an initial value of a second initialization sub-signal, wherein the second initialization sub-signal is an initialization signal received by the light-emitting device during a keep frame;

selecting a specified gray level from the plurality of specified gray levels as a target gray level;

based on the initial value of the second initialization sub-signal, adjusting the second initialization sub-signal stepwise until a value of an adjusted second initialization sub-signal exceeds a preset range of the second initialization sub-signal, so that a plurality of values of the second initialization sub-signal within the preset range of the second initialization sub-signal are obtained, wherein a number of the plurality of values of the second initialization sub-signal is K, the N values of the first initialization sub-signal and the K values of the second initialization sub-signal are divided into N×K second parameter groups, a second parameter group includes a single value of the first initialization sub-signal and a single value of the second initialization sub-signal;

obtaining a plurality of flicker values of the display module at the target gray level for the preferred value of the light-emitting delay time and each second parameter group of the N×K second parameter groups; and determining a value of the second initialization sub-signal, corresponding to a minimum flicker value of the display module at the target gray level, from the plurality of values of the second initialization sub-signal as a preferred value of the second initialization sub-signal.

11. The parameter adjustment method according to claim 9, further comprising:

determining a value of the first initialization sub-signal, corresponding to a minimum flicker value of flicker values of the display module at the target gray level for the plurality of values of the first initialization sub-signal and the preferred value of the second initialization sub-signal, as a preferred value of the first initialization sub-signal.

12. The parameter adjustment method according to claim 4, further comprising:

setting an initial value of a data keep signal, wherein the data keep signal is a data signal received by a data signal terminal of a pixel driving circuit included in the display module during a keep frame;

based on the initial value of the data keep signal, adjusting the data keep signal stepwise until a value of an adjusted data keep signal exceeds a preset range of the data keep signal, so that a plurality of values of the data keep signal within the preset range of the data keep signal are obtained;

obtaining a flicker value of the display module at the target gray level for the preferred value of the light-emitting delay time, the preferred value of the first initialization sub-signal, the preferred value of the second initialization sub-signal, and each value of the data keep signal; and determining a value of the data keep signal corresponding to a minimum flicker value at the target gray level for the plurality of values of the data keep signal as a preferred value of the data keep signal.

13. The parameter adjustment method according to claim 4, wherein the preset range of the first initialization sub-signal is from −1 V to −6 V; and/or the preset range of the second initialization sub-signal is from −1 V to −6 V.

14. The parameter adjustment method according to claim 12, wherein the preset range of the data keep signal is from 1 V to 8 V; and/or the preset range of the light-emitting delay time is from 0 to 30 times a row scan period.

15. An electronic device, comprising a processor and a memory, wherein the memory stores computer program instructions that, when executed on the processor, cause the processor to perform one or more steps of the parameter adjustment method according to claim 1.

16. A parameter adjustment system of a display module, comprising:

a processor configured to perform one or more steps of the parameter adjustment method according to claim 1;

a testing device coupled to the processor, wherein the testing device is configured to output a control instruction for controlling display of the display module according to the light-emitting delay time, a first initialization sub-signal, a second initialization sub-signal and a data keep signal that are from the processor; and a detection device coupled to the processor, wherein the detection device is configured to detect a flicker value when the display module displays an image, and send the flicker value to the processor.

17. A display module, comprising a display panel and a driver chip, wherein the driver chip stores the preferred value of the light-emitting delay time, the preferred value of the light-emitting delay time is obtained through the parameter adjustment method according to claim 1; and the driver chip is configured to generate light-emitting signals according to the preferred value of the light-emitting delay time and transmit the light-emitting signals to the display panel.

18. A display device, comprising the display module according to claim 17.

19. A non-transitory computer-readable storage medium storing computer program instructions that, when executed on a processor, cause the processor to perform one or more steps of the parameter adjustment method according to claim 1.

20. A computer program product stored on a non-transitory computer-readable storage medium, wherein the computer program product comprises computer program instructions that, when executed on a computer, cause the computer to perform the parameter adjustment method according to claim 1.

* * * * *